US009519986B1

(12) United States Patent
Kolliopoulos et al.

(10) Patent No.: US 9,519,986 B1
(45) Date of Patent: Dec. 13, 2016

(54) USING STAND-IN CAMERA TO DETERMINE GRID FOR RENDERING AN IMAGE FROM A VIRTUAL CAMERA

(71) Applicant: Pixar, Emeryville, CA (US)

(72) Inventors: Alexander Kolliopoulos, Pleasant Hill, CA (US); Brandon Kerr, Oakland, CA (US)

(73) Assignee: PIXAR, Emeryville, CA (US)

( * ) Notice: Subject to any disclaimer, the term of this patent is extended or adjusted under 35 U.S.C. 154(b) by 310 days.

(21) Appl. No.: 13/923,252

(22) Filed: Jun. 20, 2013

(51) Int. Cl.
  *G06T 19/00* (2011.01)
  *G06T 13/20* (2011.01)
(52) U.S. Cl.
  CPC ..................................... *G06T 13/20* (2013.01)
(58) Field of Classification Search
  CPC ....................................................... G06T 19/00
  USPC ......................................................... 345/474
  See application file for complete search history.

(56) References Cited

U.S. PATENT DOCUMENTS 5,977,978 A * 11/1999 Carey et al. ................... 345/419
8,665,261 B1 * 3/2014 Baraff ...................... G06T 7/0032
                                              345/419
9,007,379 B1 * 4/2015 Shafer et al. ................. 345/473

* cited by examiner

*Primary Examiner* — Jacinta M Crawford
*Assistant Examiner* — Shivang Patel
(74) *Attorney, Agent, or Firm* — Kilpatrick Townsend & Stockton LLP

(57) ABSTRACT

Systems and methods can provide computer animation of animated scenes or interactive graphics sessions. A grid camera separate from the render camera can be created for segments where the configurations (actual or predicted) of the render camera satisfy certain properties, e.g., an amount of change is within a threshold. If a segment is eligible for the use of the separate grid camera, configurations of the grid camera during a segment can be determined, e.g., from the configurations of the render camera. The configurations of the grid camera can then be used to determine grids for rendering objects. If a segment is not eligible for the use of the grid camera, then the configurations of the render camera can be used to determine the grids for rendering.

21 Claims, 14 Drawing Sheets

USING STAND-IN CAMERA TO DETERMINE GRID FOR RENDERING AN IMAGE FROM A VIRTUAL CAMERA

BACKGROUND

The present disclosure generally relates to computer animation, and more specifically to rendering.

In computer animation involving a three-dimensional model, images are created based on the location of the virtual camera (rendering camera). The position of the virtual camera and other configuration information can be used by movie director to determine a particular animated scene of an animated movie. Based on the configuration of the virtual camera, an image frame is rendered in accordance with the objects viewed by the virtual camera.

As part of the rendering process, the position of virtual camera for a given frame can dictate how animation parameters (e.g., a grid) are used to render the image. Since the camera can move from frame, the animation parameters may change. Some camera motions or state changes create parameters that produce undesirable render artifacts. For example, when the motion of the camera oscillates, so can the animation parameters, thereby causing artifacts. Further, manual identification and rectification of such issues is time-consuming.

Therefore, it is desirable to provide new systems and methods for automatically addressing such problems associated with certain motion of a rendering camera in a three-dimensional animated world.

BRIEF SUMMARY

Embodiments can provide systems and methods for providing computer animation of animated scenes or for providing interactive graphics sessions. A grid camera separate from the render camera can be created for segments where the configurations (actual or predicted) of the render camera satisfy certain properties, e.g., an amount of change is within a threshold. If a segment is eligible for the use of the separate grid camera, configurations of the grid camera during a segment can be determined, e.g., from the configurations of the render camera. The configurations of the grid camera can then be used to determine grids for rendering objects. If a segment is not eligible for the use of the grid camera, then the configurations of the render camera can be used to determine the grids for rendering.

Other embodiments are directed to systems, portable consumer devices, and computer readable media associated with methods described herein.

DEFINITIONS

Figure 1:
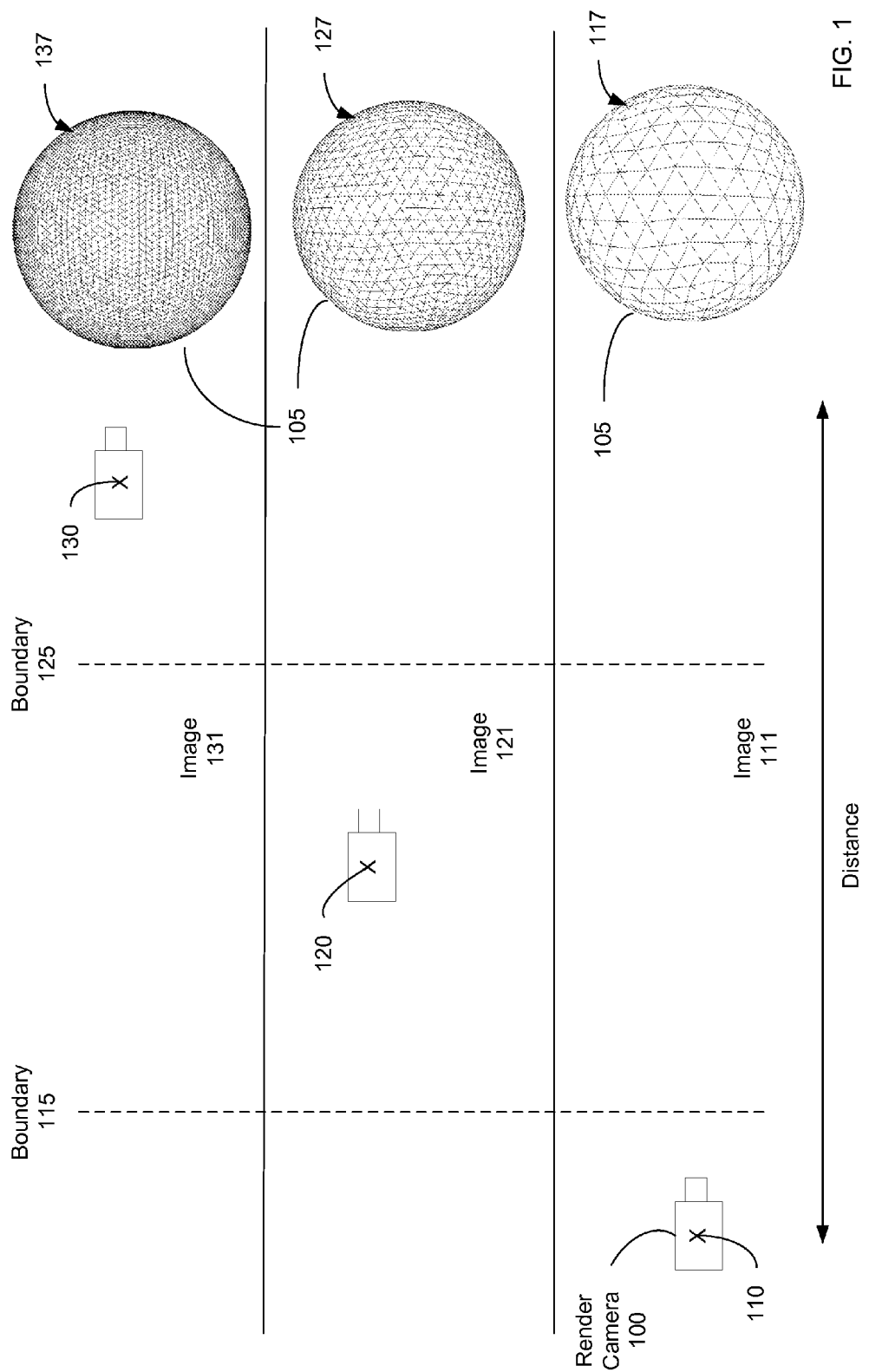
FIG. 1 is a diagram showing the impact of a render camera 100 at three different locations on a grid resolution of an object 105.

An animated scene is a series of images (frames) as seen by a virtual movie camera (render camera) in a three-dimensional animated world. The frames are effectively obtained at successive times, e.g., as would be done for a physical camera. Different animated scenes may be obtained via different paths of the render camera. Rendering is the process for creating each image from the three-dimensional (3D) animated world and a current configuration of the virtual camera, e.g., using geometric and/or mathematical descriptions of objects in the 3D world. An animated scene may be a single shot, e.g., where a camera cut occurs at the beginning and the end of the single shot. After camera cut, the camera may be moved to a new location and rendering (filming) may begin again. The configurations of the camera in the animated scene would normally be determined by a director of the movie, and would typically be known before rendering of the scene begins. An animated scene may include one or more segments. The beginning and ending of a segment may be determined by various criteria, such as a specified amount of time or movement of a render camera.

An interactive graphics session corresponds to a series of images as determined by a render camera, where configurations of the camera are not known ahead of time. For example, in a gaming environment, the user can move the camera by use of a game controller to move the character throughout the three-dimensional animated world. The view of the character can correspond to the view from the render camera.

A configuration of a render camera can include various geometric and optical parameters, such as location (e.g.

Cartesian coordinates), orientation (e.g. direction camera is facing, which may be specified by yaw, pitch, and roll), field of view (FOV) that corresponds to the width that the camera is allowed to see, depth of field, and focus distance that determines the aperture. Geometric properties include location and orientation, Optical properties include focal length and aperture. These configuration parameters impact what objects are in the image and how the image is rendered. For example, the aperture determines how blurry things become as they get closer or farther away, as determined by the circle of confusion.

A grid corresponds to a set of points associated with an object and used in rendering the object. For example, the points of a grid may be used to determine how different points on the surface of the object should be shaded given the current configuration of the render camera. The number of points in a grid corresponds to a resolution of the grid, where more points corresponds to a higher resolution. The points of the grid may define polygons. The resolution object may change based on distance of the object from the render camera. The polygons at any given resolution can form a tessellation pattern. Different areas of an object may have different tessellation patterns (example of a grid), such that different areas are represented with different resolution.

Dicing corresponds to a process of decomposing an object into smaller polygons, certain details being described in U.S. Pat. No. 7,129,940. Many conventional techniques may be used to dice the object, for example, dicing may divide the object into triangles, four-sided polygons, and the like. Intersection points of the polygons can form a grid, or the resulting polygons can be considered a grid. As examples, these points can be used for shading (e.g., (displacement, surface shading, atmospherics) and shape representation. The polygons can be smaller than a pixel, and thus may be subpixel-sized micropolygons. Each polygon may be tested for visibility and used to make a pixel (via sampling and filtering steps).

DETAILED DESCRIPTION

Embodiments are directed to using a render camera for determining the objects within a series of images, and using a separate grid camera for determining grid(s) to be used in rendering the objects for the images. There are times the render camera may move back and forth across a boundary that determines the size of a grid. In such a case, the grid would change unnecessarily and possibly create artifacts when the render camera is used for determining the grid(s). Instead, the grid camera can be at a stable position(s) (or other configuration parameter) when the render camera's position does change significantly. The grid camera can be stable (not necessarily stationary though), such that high frequency details are removed, e.g., remove high frequency motion (e.g., back and forth) of the render camera. In this manner, features (e.g., dicing or tessellation) in a render can be stabilized. The configurations of the grid camera can be automatically computed from configurations of the render camera.

I. Introduction

As mentioned above a virtual camera (render camera) is used to determine what is seen in a three-dimensional animated world. The render camera can be used to determine a series of images that are used as part of an animated scene (e.g., part of a movie) or to depict the action in an interactive graphics session (e.g., as part of a video game). Typically, a configuration (e.g., a position, orientation, or optical settings) of the render camera is used to determine how an object is rendered. For example, a grid for representing an object (e.g., related to shape) or for use in determining other characteristics (e.g., shading) of an object can be dependent on the configuration of the render camera. When the render camera is close to an object, the grid may be different than when the render camera is far away from the object.

A. Resolution of Grid Based on Camera Configuration

The location of the render camera can dictate the resolution of a grid used on an object. The resolution of the grid may vary based on the distance from the render camera. Thus, a grid used for an object may change from frame to frame due to the motion of the render camera. A trigger point for changing the grid from one resolution to another may be defined by particular distance (boundary).

As an example, when an object is further away from the render camera, it is going to take up fewer pixels than when the object is closer to the render camera. If the color of the object is computed at a pixel of the resulting two dimensional (2D) image, the render module should know the object takes up X number of pixels at one location and Y number of pixels at another location. The number of pixels corresponding to a particular object may dictate a grid resolution used in rendering the object (e.g., higher grid resolution when object takes up more pixels).

FIG. 1 is a diagram showing the impact of a render camera 100 at three different locations on a grid resolution of an object 105. Render camera 100 showing a three different distances away from object 105, where the horizontal axis is distance. As shown, object 105 is a sphere, although the object can be of any shape. The diagram is broken up into three separate rows, where each row corresponds to a different location of render camera 100, and thus corresponds to a different image.

For image 111, render camera 100 is a location 110, which is at the farthest distance away from object 105 out of the three different location shown. For location 110, a grid 117 is used for object 105. Grade 117 has the lowest resolution out of the three different images. Since the distance a render camera from object 105 is relatively large, the resolution can be less without impacting the quality of image 111. Grid 117 may represents the surface to the resolution that the computer is going to render at. Grid 117 may be composed of polygons or micro polygons, as may other grids described herein, as described above.

For image 121, render camera 100 is at location 120, which is on the other side of boundary 115. In this example, boundary 115 is used to determine when a grid resolution of object 105 is to change. As shown, object 105 has grid 127, which is at a higher resolution than grid 117. Since render camera 100 is closer to object 105 at location 120 than at location 110, the resolution of the grid may increase so that object 105 can be shown with greater detail within image 121. Object 105 will form a larger portion of image 121 than object 105 formed an image 111, and thus a lower resolution grid can be apparent to the viewer. If the resolution was not increased, the quality of the image may be degraded.

For image 131, render camera 100 is at location 130, which is on the other side of boundary 125. In this example, boundary 125 is used to determine a grid resolution of object 105 is to change. As shown, object 105 has grid 137, which is at a higher resolution than grid 127. Since render camera 100 is closer to object 105 at location 130 than at location 120, the resolution of the grid may increase so that object 105 can be shown with greater detail within image 131. Object 105 will form a larger portion of image 131 than object 105 formed an image 121, and thus a lower resolution grid can be apparent to the viewer. If the resolution was not increased, the quality of the image may be degraded.

The rendering module may also increase the resolution of the grid when other configuration parameters (i.e. besides position) are changing. For example, if an object is out of focus due to a change in aperture or zoom setting, the rendering module may decrease the grid resolution when the image is out of focus. The resolution also may change based on viewing angle, e.g., when one part of an object requires high detail (such as a rough surface) in another part of the object requires lower detail (such as a smooth surface).

One can always sample that object at the higher grid resolution 137, and have an excess of micropolygons inside each pixel. But this would be constitutionally expensive. Over- or under-sampling can easily disrupt the balance between image fidelity and computational cost without a system to maintain it. Thus, the process of changing the grid resolution depends on a configuration of the render camera. However, this changing of the grid resolution can cause problems.

B. Artifacts

As mentioned above, an object can be diced into grids for shading or for geometric representation purposes in rendering the object. The grid may be computed per frame (image) from the camera. If the camera moves, then those grids get recomputed, and they might not be in the exact same positions as they were in the previous frame, which can cause visual artifacts. The artifacts can be particularly noticeable when grids are repeatedly recomputed due to things like camera oscillation.

Figure 2:
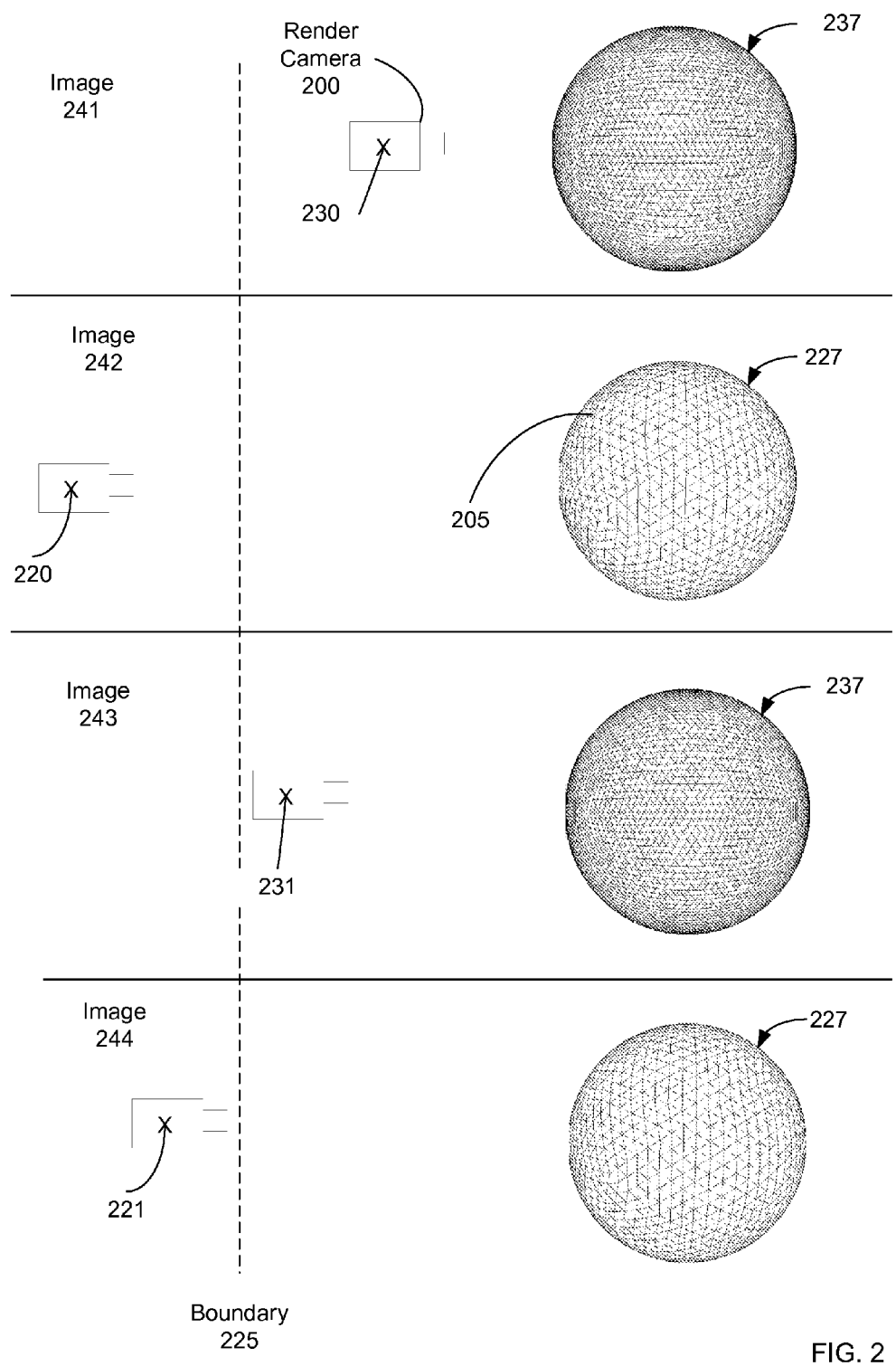
FIG. 2 shows a diagram of a render camera 200 oscillating back and forth across a boundary 225 relative to object 205.

FIG. 2 shows a diagram of a render camera 200 oscillating back and forth across a boundary 225 relative to object 205. As with FIG. 1, each row of the diagram corresponds to a different image. Boundary 225 is used as a decision point as to a grid resolution of object 205.

For image 241, render camera 200 is at location 230, which results in grid 237 being used for object 205. In the subsequent images, render camera 200 moves back and forth across boundary 225, resulting in different grids being used for different frames.

For image 242, render camera 200 is at location 220, which results in grid 227 being used for object 205. Since location to 20 is on the far side of boundary 225, the lower resolution grid 227 is used. The change of the grid resolution dependent on render camera 200 would typically be changed instantaneously at boundary 225.

For image 243, render camera 200 is moved across boundary 225 from the far side of boundary 225 to the near side closer to object 105. Specifically, render camera 200 is at location 231, which is relatively close to boundary 225. The grid resolution used for object 105 is now switched again from grid 227 back to grid 237.

For image 244, render camera 200 is moved back across boundary 225 from the near side of boundary 225 to the far side, further from object 105. Specifically, render camera 200 is at location 221, which is relatively close to boundary 225. The grid resolution used for object 105 is now switched again from grid 237 back to grid 227. As one can see, the distance between location 231 and location 221 is relatively small; however, the impact on the change of the grid resolution stays the same.

Such oscillating movement of a render camera might occur in the animator is trying to simulate filming with a handheld camera. This oscillating movement of the render camera can cause visual artifacts. Thus, a shot may have a shaky camera where the camera is moving, but is basically in the same place and looking at the same object throughout the shot. In practice, any camera motion can cause a grid (e.g., a dicing grid) to change. Thus, if there is any camera motion, inconsistent grids may occur from every frame to the next when a render camera is used to determines the grids.

Accordingly, breaking an object into grids may be a discrete operation, and the module may change the number of points that are shaded as the render camera gets closer to the object. If the camera is moving slowly, at some point, a viewer can visually notice when that change in grid resolution occurs, as it happens all of a sudden. If those boundaries happen often, a viewer may not see it as much. But if they are larger and have larger jumps in the resolution, the effects can be more visible. However, at high frequency, small changes can still be noticeably distracting to a viewer (e.g., distracting sizzling artifacts). Embodiment can address issues with high frequency and low frequency artifacts.

One of the most common rendering artifacts in rendering animated scene is frame-to-frame shading pops due to sudden dicing changes caused by a moving camera. This can be expensive for two reasons: 1) the shot may be rendered at full resolution in lighting before the problem is seen (costly and compute cycles) and 2) someone has to look at the problem to manually determine the grid resolution to use for each frame and test that it solves the problem before rendering again (person cycles). Such problems can be particularly persistent when a director of the animation scene updates the configurations of the render camera for artistic effect. Alternatively, one could crank quality settings by default (such as lowering shading rate or disabling raster oriented dicing) on particularly problematic geometry, making them much more expensive to render (generally causing many more shading samples to be required). Embodiment can avoid such computation and human costs by having a computer system automatically determine position(s) of a grid camera for use in determining grid resolutions.

II. Determination of Grid Camera

Embodiments of the present invention can address the artifacts described above by using a separate grid camera that is used to determine a grid resolution for an object (or part of an object) for a given frame. As described above, a render module may use a different grid resolution for an object from one frame to the another due to short quick movements of the camera. As a result, there can be high frequency details like specular reflections, which would pop on and off from frame to frame.

If a still (or stable) camera is used, then the artifacts are removed or reduced. For example, in one embodiment, render module can dice based on a still "grid" camera, but still let the director move the render camera around however much he wants. However, there may be instances where it is better to use the render camera to determine a grid resolution, for instance where using the render camera does not cause significant artifacts. Embodiments can determine when a segment is eligible to use the separate grid camera, and automatically determine stable configurations of the grid camera to provide grids for rendering. For example, when a render camera is oscillating back and forth across a boundary, the grid camera can be placed in one location on one side of the boundary and not move.

A. Method of Eligibility Grid Camera

Figure 3:
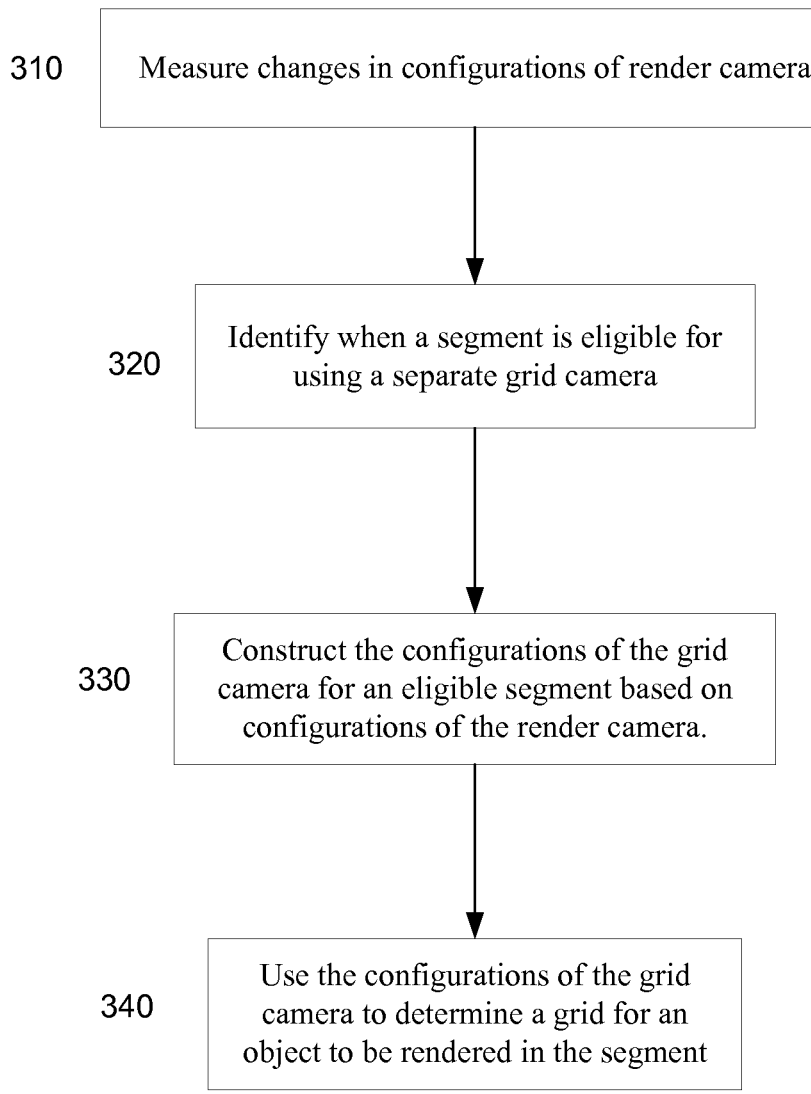
FIG. 3 is a flowchart of a method 300 for performing computer-generated animation using a render camera and a separate grid camera by according to embodiments.

FIG. 3 is a flowchart of a method 300 for performing computer-generated animation using a render camera and a separate grid camera by according to embodiments. The render camera is used to determine what the viewer sees (e.g., the audience of the movie) and the grid camera can be used to determine a resolution of a grid of an object that is seen by the render camera. Method 300 and other methods described herein can be performed wholly or partially by a computer system, e.g., having a processor programmed by software modules.

At block 310, changes in configurations of the render camera are measured. In one embodiment, the changes may be measured for a particular segment of the animated scene. Since the configurations of the render camera are known, the configurations for an upcoming segment can be analyzed. In another embodiment, the changes may be measured for previous configurations of the render camera (e.g., for video games). The change in configurations of the render camera can be measured backward or forward, depending on the context.

At block 320, the eligibility for the use of a separate grid camera in rendering a segment is identified. Heuristics may be used to determine when a segment is eligible for using a separate grid camera. In various embodiments, the eligibility may be determined based on the existence of artifacts of the render camera is used and/or a sufficient quality achievable with a separate grid camera. Whether the grid camera can be still or relatively stable while also providing a sufficient quality image can be used as a criteria. Multiple criteria may be used. The use of the criteria can allow for a computer system to automatically determine the eligibility.

In one embodiment, a criteria can be that the configurations of the render camera in next segment (e.g., a single shot) of an animated scene do not change significantly, and thus a still or stable grid camera can be used. For example, if the render camera moves less than a threshold distance throughout the segment (although small repetitive movement would be allowed), then a still grid camera can be used to lock in a single grid for the segment. In other embodiments, the grid camera can change configuration but with more desirable behavior than the render camera, e.g., more stability In one implementation, if the render camera does move over a long distance during a segment, then the computer can identify the segment as not being eligible. In this case, the render camera can be used to determine the grids for the segment. For example, the computer can determine that a stable grid camera cannot provide the geometry at the proper resolution throughout the entire shot. Thus, in one aspect, embodiments use a grid camera when there is sufficient render camera motion to cause artifacts, but insufficient to make it so that the grid camera cannot be used.

At block 330, the configurations of the grid camera are constructed based on configurations of the render camera. In one aspect, the grid camera is constructed to be representative of the render camera, but be stable. For example, a configuration of the grid camera can be determined based on an average of configurations of the render camera during a segment. The configurations of the grid camera would be different than the configurations of the render camera, thereby allowing the grid camera to be still or stable.

Figure 4:
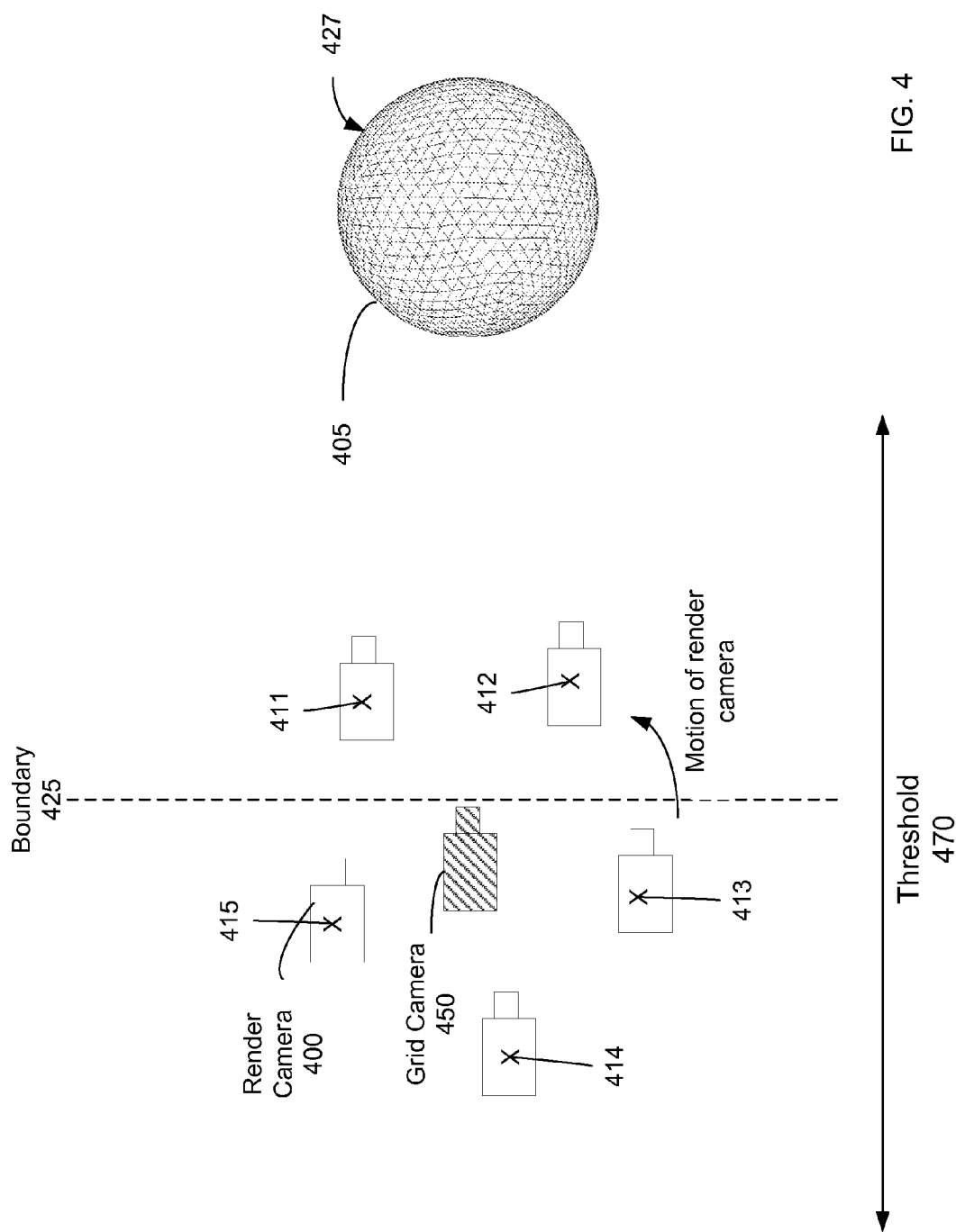
FIG. 4 is a diagram illustrating the construction of a grid camera 450 based on configurations of the render camera 400 according to embodiments.

At block 340, the configurations of the grid camera are used to determine a grid for an object to be rendered in the segment. The grids can be determined based on the configurations of the grid camera using the same algorithms as would be used if the grids were determined based on the configurations of the render camera. As described above, the configurations (e.g., locations) of the grid camera can result in less changes in the grids from one frame of the segment to another frame of the segment. Embodiments can also apply to the use of stereo rendering with a render camera assigned to each eye (left and right). For example, there can be two independently-controlled grid cameras, one for each render camera B. Constructing Grid Camera FIG. 4 is a diagram illustrating the construction of a grid camera 450 based on configurations of the render camera 400 according to embodiments. Render camera 400 is shown at five different locations 411-415 during a segment. Locations 411 and 412 are shown on a near side of boundary 425, wherein boundary 425 is used as a trigger to change from one grid resolution to another. Locations 413-415 are on the far side of boundary 425 and correspond to a grid 427 of object 405.

Threshold 470 indicates a total distance that the motion of render camera 400 is required to be within for eligibility of the use of grid camera 450 according to one embodiment. As shown, the motion a render camera 400 during the segment is within threshold 470. For example, the distance between any two locations is less than threshold 470, and thus a grid camera may be used. In one implementation, the locations within a segment can be determined, and the largest separation distance between any two locations can be compared to threshold 470 to determine whether the motion of render camera 400 is within threshold 470.

The configuration (e.g., position) of grid camera 450 can be determined based on locations 411-415 of render camera 400. All of the locations of render camera 400 during a segment can be used. Although one position of grid camera 450 is shown during the segment, multiple positions of grid camera 450 can be used. But, such multiple positions may be on a same side of boundary 425. In one embodiment, an average of the locations 411-415 of render camera 400 may be used to determine the location of camera 450 during the segment.

Accordingly, embodiments can provide a function that takes all the camera motion (or other changes in configuration) and produce a grid camera that is optimal. The optimality can be based on various factors, e.g., a frequency of change in the resulting grids, a similarity to the configurations of the render camera, and other factors. The function can take into account how much the circle of confusion changes for certain positions.

As an example, the function (e.g., an optimization function) for determining the configurations of the grid camera can determine where the render camera is looking over the course of an entire scene or just one segment of the scene, and how far the focus distance is set, as well as other parameters. The optimization function may take an average of the various parameters. The average may be a weighted average based on an amount of time that certain parameters are used. For example, if the render camera is at one location for a long time, that location may be rated higher than other locations.

In one embodiment, the function can determine a configuration of the grid camera by using a vector and then finding a position on that vector. The vector can be multi-dimensional and correspond to any one of the configuration parameters. In this manner, the function can account for when the render camera rotates and the field of view (FOV) widens. Such parameters can determine a frustum that forms a wedge in the space of what the camera can see. Embodiments can determine an average FOV for first location that represents the FOV of the configurations of the render camera, and then walk back a camera from the first location to a second location until its wedge can see everything that all wedges of the render camera in the scene (or segment of scene) can see. At this point, adjustment can be made to the focal distance so that the camera at the second location does not make everything blurry. This configuration of the camera at the second location can be used for the grid camera. In this manner, the grid camera includes the field of view for all of the actual render cameras.

The function can look at a disparity between a parameter of the render camera (e.g., general wideness of the view) and what the grid camera would be doing, e.g., as part of an optimization process. The grid camera FOV can depend on various factors, such as the orientation of the camera, the sort of variances in its position, and how much the FOV of the render camera is changing over the frames of a segment.

Besides reducing artifacts, the use of the grid camera can also increase computational efficiency. For example, a check for which grid to use at each frame based on the current configuration of the render camera may not need to be performed. Instead, the grid camera can be identified as corresponding the one or few grids for an entire segment, which can be done at the beginning of a scene, e.g., as part of determining the configuration(s) of the grid camera. Thus, the determination of the grid at each frame is unnecessary.

III. Animated Scene

A director or the animator of an animated scene (e.g., an animated movie) wants to have full control over the camera to provide the artistic expression of the filmmaker. The director does not want to have a position of the camera be dictated by technical constraints. Embodiments can be used to reduce artifacts, thereby allowing the director the camera as he/she wishes. As described above, a separate grid camera can be used.

For example, by examining camera motion and orientation when the camera polish department is marked done or closes a fix, shots that have only a small amount of camera motion (for example, due to simulated hand-held camera shake) can be identified. In these cases, embodiments can automatically place a grid camera that approximates the best configuration (e.g., position) of the camera throughout the shot. Such a solution can reduce computer cycles proactively, before a shot enters rendering. Human time is also reduced because no human intervention is required. Shots containing especially problematic camera configurations can be identified as difficult to automate, and a manual plan can be set up.

A. Method

Figure 5:
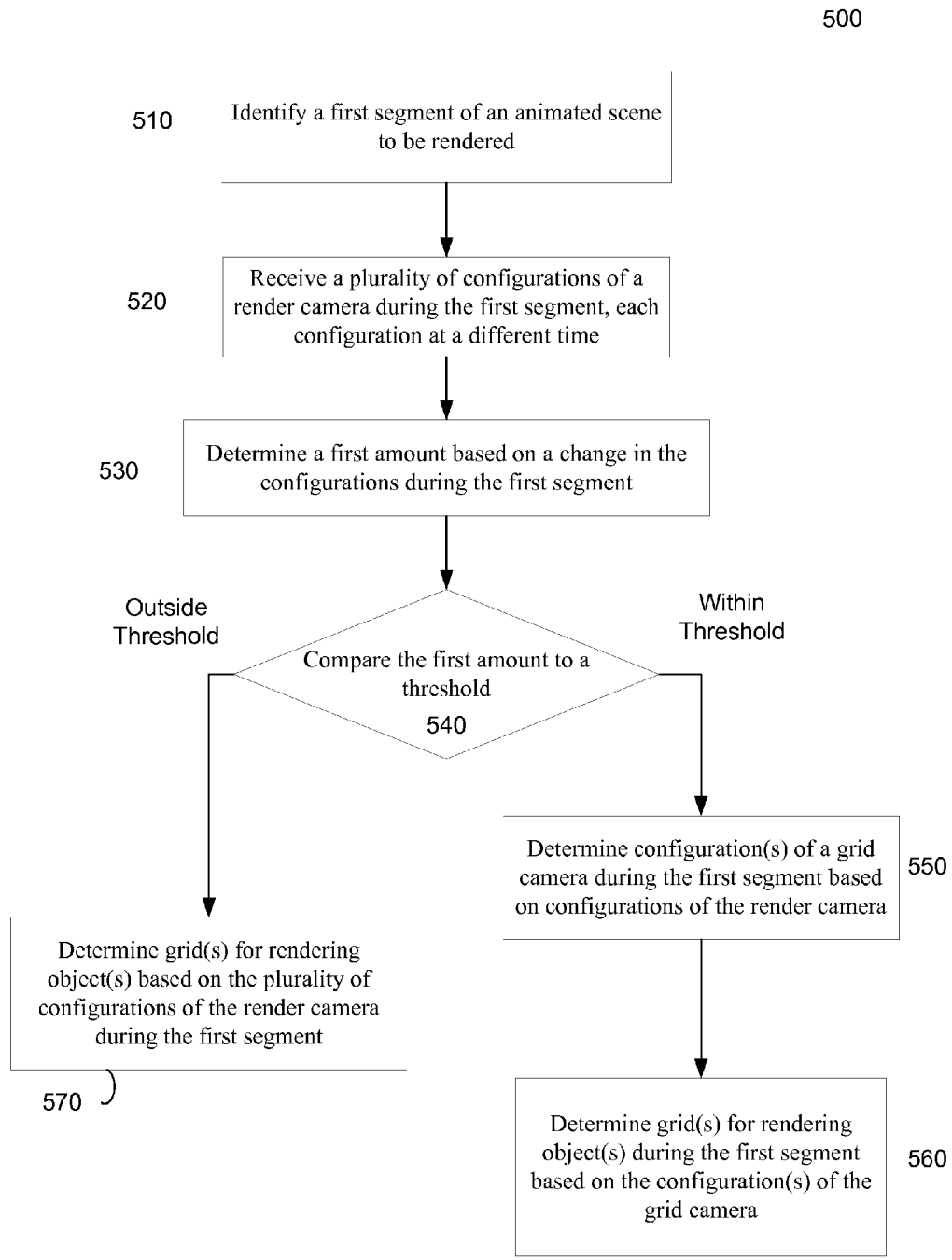
FIG. 5 is a flowchart of method 500 for performing computer-generated animation of an animated scene according to embodiments.

FIG. 5 is a flowchart of method 500 for performing computer-generated animation of an animated scene according to embodiments. Method 500 may be used in rendering images of a segment of an animated scene such that the grids used for one or more objects do not cause artifacts, reducing the effects of artifacts to a viewer of the images. Method 500 may be performed wholly or partially by a computer system.

At block 510, a first segment of an animated scene to be rendered is identified. The first segment may be only part of the animated scene or include the entire animated scene. The animated scene may be a single shot of an animated movie. The first segment may be identified through user input, e.g., the user may specify the animated scene to be analyzed. In another embodiment, the computer can automatically break up an animated scene into multiple segments and then analyze the segments. These multiple segments can be of uniform length or can vary in length, where starts and stops are identified using specific criteria (e.g., a jump in the location of the render camera). Different animated scenes can also be identified automatically in a similar fashion. As examples, movies often include brief shots that are around 200 frames.

At block 520, a plurality of configurations of a render camera is received during the first segment. Each configuration occurs at a different point in time. For example, each configuration can correspond to a different frame of the animated scene. Configurations at different frames may be identical or may differ. In this process though, at least some of configuration parameters of the render camera will change during the segment.

The configurations of the render camera determine one or more objects seen in images of the first segment of the animated scene. For example, if the render camera is rotated, then different objects may be seen. Further, optical parameters can determine which objects are in focus and which objects fall within the field of view.

At block 530, a first amount is determined based on a change in the configurations during the first segment. Embodiments can evaluate the configurations of the render camera through the course of a whole shot (i.e. at each of the frames) and determine how much particular configuration parameters have changed. In various embodiments, the first amount may correspond to only one parameter, all of the parameters of the configurations, or just a subset of the parameters.

In one embodiment, the first amount corresponds to the greatest difference of one parameter for any of the configurations. For example, two configurations can be identified as having locations that are the furthest apart, with the first amount corresponds the distance between the two locations. The same analysis may be made for any of the parameters. In one implementation, multiple parameters may be used such that each configuration can be identified as a multidimensional point in the parameter space. The greatest difference can be determined between any of the two configurations, where the differences for all the parameters are taken into account.

In another embodiment, the first amount can also correspond to a statistical value, such as a standard deviation, expected absolute deviation, or variance. Thus, the first amount can be derived from all of the configurations during the first segment. Such statistical values can also be determined for just one parameter.

At block 540, the first amount is compared to a threshold. For example, the greatest difference between any two locations can be compared to a threshold distance to determine whether the motion of the render camera is large (outside threshold) during the first segment. In this manner, any large distance points can be identified even if the beginning and ending locations for the segment are the same. For example, if the render camera was completely still until frame 51, but then move significantly at frame 52, and then on frame 53 it looks back the initial position, embodiments can identify such an example as being outside of the threshold. Thus, whether the changes to the configurations of the render camera is within tolerance during the first segment can be determined.

The threshold (tolerance) can be any value, and can even require no change at all. The threshold can be determined dynamically, e.g., based on properties of the animated scene. In various embodiments, a larger threshold may be used for a longer animated scene, and a smaller threshold in use for shorter animated scene. As another example, the tolerance can vary based on the locations of the objects in the animated scene. If the objects are far away from the render camera, then the tolerance can be larger. The threshold can also be dependent on configuration parameters other than any parameters used to determine the first amount.

At block 550, when the first amount is within a threshold, one or more configurations of a grid camera during the first segment can be determined based on the configurations of the render camera. For example, if the position of the render camera oscillates back and forth across a central point, the grid camera can be configured to sit at the single location of the central point during the first segment. However, as explained herein, the grid camera is not necessarily restricted to a single configuration.

The one or more configurations of the grid camera differ from the configurations of the render camera. That is, at least one of the configurations of the grid camera is different from at least one of the corresponding configurations of the render camera at the same frame. It is possible that one configuration of the grid camera is equal to one of the configurations of the render camera. For example, the render camera may be positioned at a central point of oscillation for one frame, and thus the grid camera position of the central point may have a certain configuration as a render camera for that one frame.

In some embodiments, more than one amount in more than one threshold may be used. For example, if the first amount corresponds to a first parameter, the second amount can correspond to a second parameter. The first amount can be compared to a first threshold and the second amount can be compared to a second threshold. The second parameter can be required to be within the second threshold for the grid camera to be used. Alternatively, the value the second parameter can simply be used to determine value of the first threshold. Additionally, the second amount can correspond to a statistical value with the first amount corresponding to a maximum difference between two configurations.

At block 560, one or more grids are determined based on the one or more configurations of the grid camera. The various grids may correspond to different grid resolutions or simply have different patterns. These one or more grids may be determined using the same or similar algorithms that are normally used for determining grids based on the rendering camera.

At block 570, when the first amount is outside the threshold, one or more grids are determined based on the plurality of configurations of the render camera during the first segment. For example, when the render camera moves a large amount during the first segment, it can be identified that the grid camera is not suitable, and thus the render camera would be used for determining the grids.

Regardless of how the grids are determined, the grids may be used for rendering the one or more objects during the first segment. For example, a grid determined based on the grid camera can be used for determining shading of an object. Even if only one configuration is used for the grid camera during the first segment, multiple grids may be determined, each for different part of the rendering process (e.g., shading and geometry).

B. Multiple Segments

As mentioned above, an animated scene may be composed of multiple segments (although it may also be composed of just one segment). Using multiple segments may be beneficial for a long animated scene, e.g., a long shot between camera cuts. In such a case, the animated scene can be broken up into multiple segments of a same length, or potentially into segments of varying length. Embodiments can then determine whether a separate grid camera is to be used for each of the segments, and then construct the grid camera for segments that satisfy a criteria of having an amount within a threshold or multiple amounts with respective thresholds.

Figure 6:
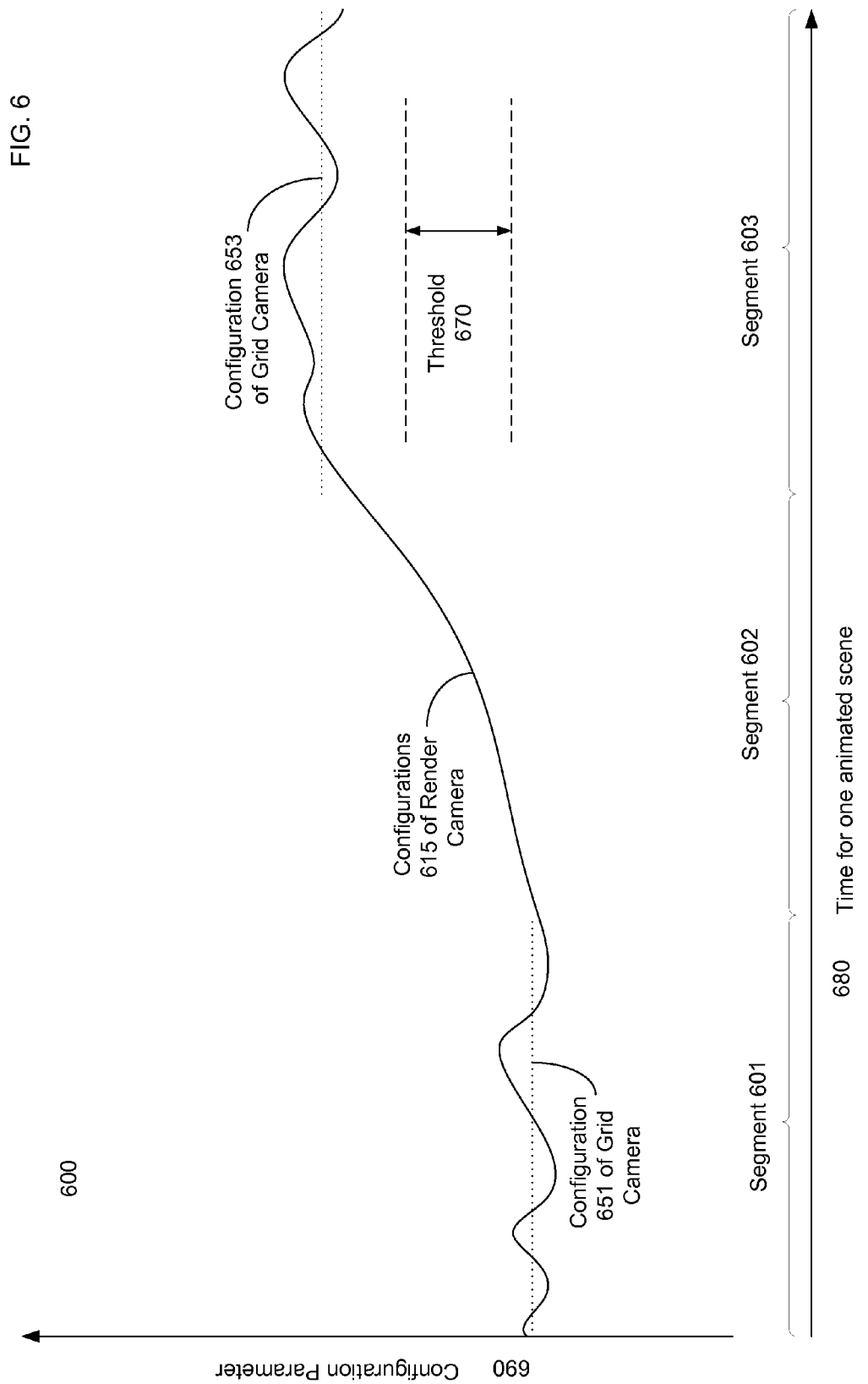
FIG. 6 is a diagram 600 illustrating the determination of whether to use a grid camera across multiple segments of an animated scene according to embodiments.

FIG. 6 is a diagram 600 illustrating the determination of whether to use a grid camera across multiple segments of an animated scene according to embodiments. Diagram 600 shows a horizontal axis 680 corresponding to the time for an animated scene. Time is shown increasing to the right. Vertical axis 690 corresponds to the value of a configuration parameter, such as position. Diagram 600 shows the change in the configuration parameter over time.

Horizontal axis 680 is broken up into three segments 601-603. As shown, segments 601 and 602 are of equal length, and segment 603 is longer. This may happen when a predetermined length is used for each of the segments, except for the last segment, which is required to end at the end of the scene (a segment can be required to have a minimum length). The configurations 615 of the render camera can be analyzed for each segment. The analysis may be performed independently for each segment, or the analysis of the one segment can depend on the configurations in another segment, as discussed later.

Threshold 670 is used for the analysis of the segments. For use of presentation, threshold 670 is shown as a general range and does not correspond to particular values of the current configuration parameter. In this example, if configuration 615 of the render camera has a maximum distance greater than a threshold 670, then a grid camera is not used. A threshold may be dependent on a length of a segment, and the segment 703 may have a larger threshold than segments 701 and 702.

For segment 601, configurations 615 of the render camera do not change significantly and are within threshold 670. Configurations 615 do change in an oscillating fashion, but the overall change from amplitude trough is not large. If the oscillating movement was around a boundary for changing resolution of grid, then such movement might cause an artifact in the images when the grids are determined based on the render camera.

Accordingly, a grid camera is used since the amount of change of the configuration parameter is within threshold 670. Such a diagram would be more complicated if more than one configuration parameter is used, e.g., as described above. In this example, one configuration 651 of the grid camera is used, and thus the configuration parameter of the grid camera is constant during segment 601. The constant value is shown at roughly the central point for changing values of the configuration parameter for configuration 615. In other embodiments, the configurations of the grid camera may change somewhat, but have less oscillation the configuration 615 during segment 601.

For segment 602, configuration 615 of the render camera change significantly in or outside of threshold 670. As one can plainly see, the maximum change of the configuration parameter is larger than threshold 670. Thus, a grid camera is not used for segment 602.

For segment 603, configurations 615 of the render camera do not have a significant maximum change. Thus, an amount of change of configuration 615 is within threshold 670. Therefore, configuration 653 of the grid camera is determined. Again, the grid camera is shown to have a single configuration 653 as a configuration parameter for the grid camera is constant during segment 603. However, multiple configurations may be used.

In some embodiments, when multiple consecutive segments are eligible for using a grid camera, the segments may be combined for the determination of the configurations of the grid camera during the combined segment. For example, an optimization process can account for the configurations of the render camera throughout the combined segment to determine the configurations of the grid camera. Even when the segments are combined, the changes in the configurations of the grid camera are stable in that they change less than the configurations of the render camera.

When the consecutive segments are not combined, parameters of the grid camera may jump from one segment to the next. This may not be an issue if the tolerance is small enough, but combining the segments can ensure a continuous change in the configurations of the grid camera. In another embodiment, a smoothing function may be used for blending the configurations of the grid camera from one segment to the configurations of the next segment, thereby providing a continuous change of the configurations of the grid camera.

C. Using Configurations in Next Segment

In one embodiment, the first amount in method 500 can be the number of contiguous segments with little change, and the number of segments can be the threshold. For example, only the grid camera is identified for use in a specified number of consecutive segments (e.g., 3 or 4), and the grid camera is used for all of those consecutive segments. The determination for each individual segment can still be done independently and based on a change of one or more configuration parameters during a respective segment.

In another embodiment, the determination of eligibility the grid camera for a segment depends on relative changes in the configurations of the render camera for a first part of the next segment. For example, if the drastic change in the configurations of the render camera occurs at the beginning of the next segment, it may not be suitable to use a grid camera in the previous segment, even though there is not a large change in the configurations for the previous segment. Note that the requirements of consecutive segments using the grid camera and the use of configurations in part of a next segment can be combined.

Figure 7:
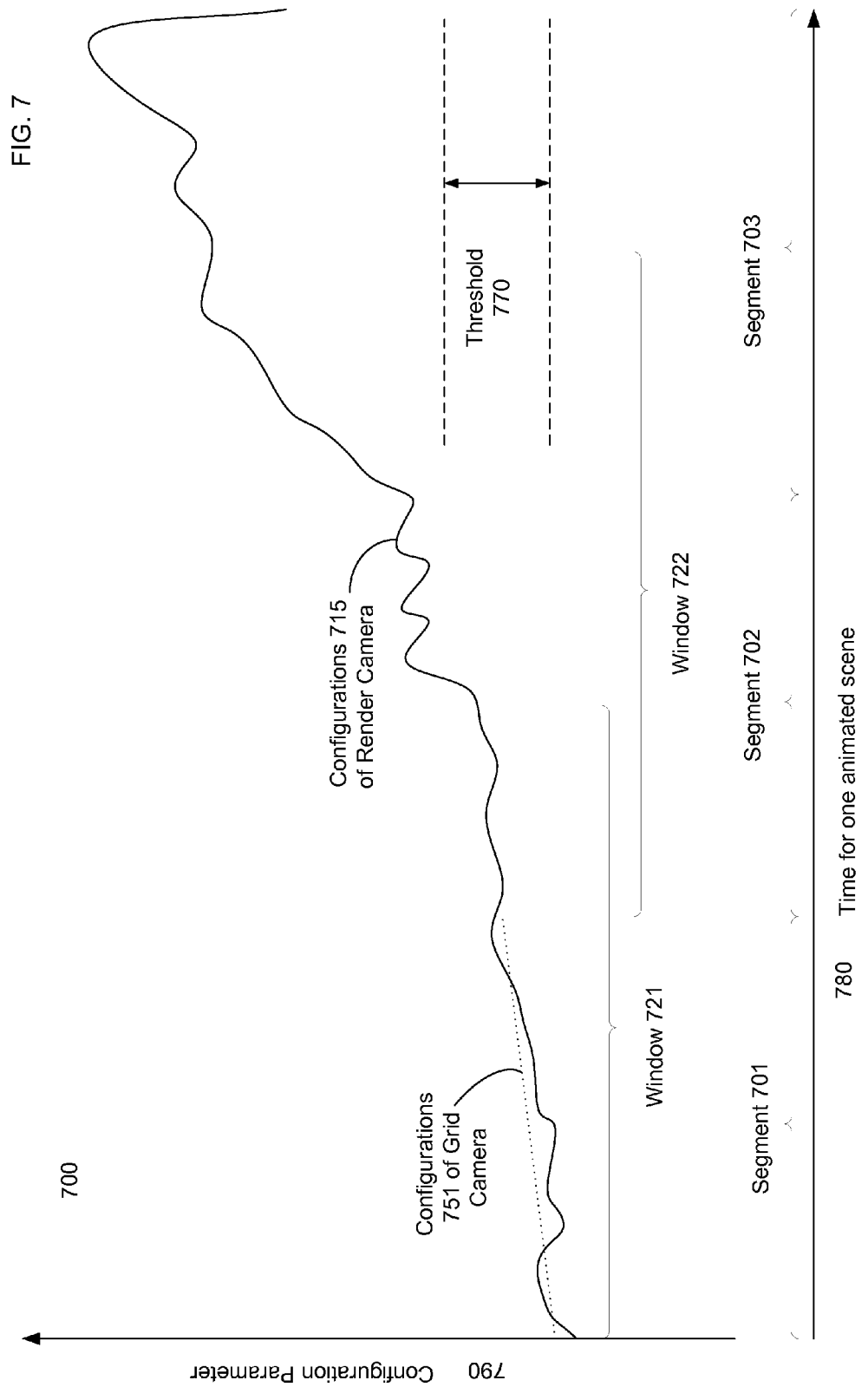
FIG. 7 a diagram 700 illustrating the determination of whether to use a grid camera for first segment using configurations in next segment of an animated scene according to embodiments.

FIG. 7 a diagram 700 illustrating the determination of whether to use a grid camera for first segment using configurations in next segment of an animated scene according to embodiments. Horizontal axis 780 and vertical axis 790 correspond to the time for an animated scene and to the value of a configuration parameter, respectively. Horizontal axis 780 is broken up into three segments 701-703. Threshold 770 is used for the analysis of the segments.

For segment 701, a configuration 715 of the render camera has an amount of change less than threshold 770. In addition to analyzing configuration 715 within only segment 701, embodiments can analyze configuration 715 for a beginning part of segment 702. For example, the first half of segment 702 can be analyzed. This provides a window 721 for analyzing configurations 715.

The part of segment 702 that is in window 721 can be used in various ways. In one embodiment, an amount of change can be determined for window 721 and that amount can be compared to a threshold. Such a threshold may differ than a threshold used to only configuration 715 within segment 701 were analyzed. Once a grid camera is not suitable for segment 701 based on the analysis of window 721, configurations 751 of the grid camera can be determined. In various embodiments, configurations 751 can be determined based on a configuration 715 throughout window 721 or just within segment 701.

Configurations 751 are shown changing during segment 701. As one can see, configurations 751 are stable compared to configurations 715 as configurations 715 provide higher frequency motion (e.g., oscillating motion up-and-down). In one embodiment, configurations 751 are constrained to be linear or some other smooth functional form. When configurations 715 of the entire window 721 are used, a single functional form can be determined for the entire window 721, but the functional form can be cut off at the end of segment 701. As shown, the line that represents configuration 751 roughly corresponds to a linear fit configuration 715 or the length of window 721, but ends at the end of segment 701. Using such a look ahead mechanism can provide more consistent grid camera configurations from one segment to another.

For segment 702, a window 722 is used. Window 722 corresponds to segment 702 in the first half of segment 703. As shown, configurations 715 have an amount of change within threshold 770 if only segment 702 is analyzed. However, configurations 715 of the render camera change significantly at the beginning of segment 703. Thus, if the entire window 722 is analyzed, segment 702 would not be found eligible for using a grid camera.

D. Combining Grid Camera Configurations Across Multiple Segments

Figure 8:
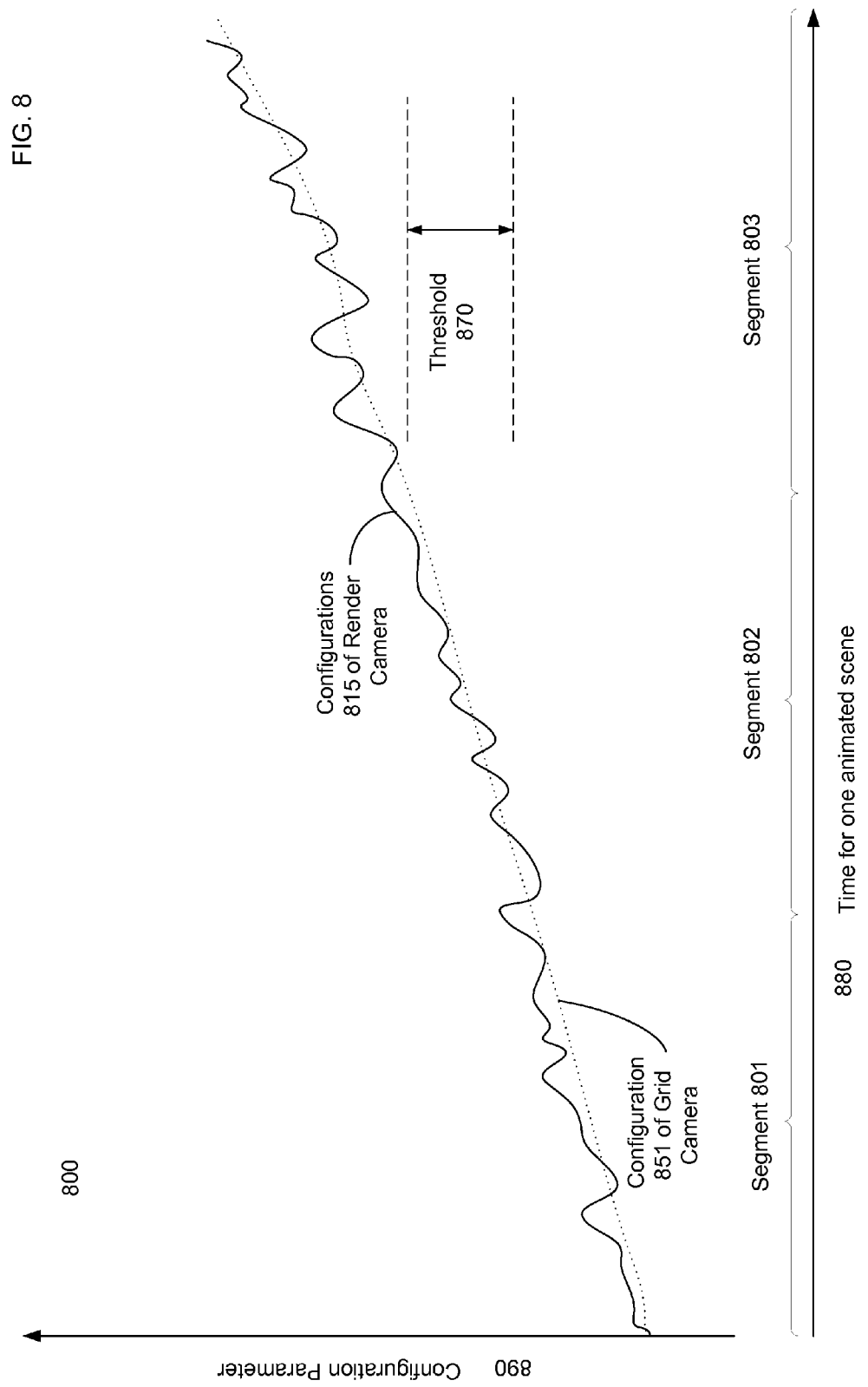
FIG. 8 is a diagram 800 showing the determination of grid camera configurations for a combined segment according to embodiments.

FIG. 8 is a diagram 800 showing the determination of grid camera configurations for a combined segment according to embodiments. Horizontal axis 880 and vertical axis 890 are similar to that of diagrams 600 and 700. The animated scene is broken up into three segments 801-803.

Configurations 815 the render camera are shown with high frequency oscillations in an overall increase in the value of the configuration parameter. Such configurations might occur when the render camera is on a moving object but shaking. For example, the render camera might be bolted onto a car, where the vibrations of the car cause the camera shake. Configuration 851 of the grid camera shows a smooth and stable trajectory of the grid camera without the high frequency oscillations of the render camera. Such a smooth trajectory can be determined in various ways, e.g., by determining a moving average or performing a functional fit across the whole scene, where the functional fit uses smooth basis functions.

In this example, segments 801-803 can be determined to be eligible for using a grid camera in various ways. In one embodiment, an overall maximum difference in the configuration parameter is not used, but instead, a statistical measure of the oscillating nature of configurations 815 is used. In one implementation, an average value for a functional fit to the configurations 815 for particular segment may be determined, and the differences of configurations 815 from this average value can be determined. When a sum of the squares of the differences (or other statistical value) is large, then a benefit may be obtained by using a grid camera. In this case, being within the threshold corresponds to the amount of change (e.g., a variation measure) being larger than a threshold, and being outside the threshold corresponds to a small variation relative to the average value.

Accordingly, in one embodiment, the grid camera can have a plurality of configurations during the first segment. And, each configuration of the grid camera can be determined from more than one of the configurations of the render camera. In various implementations, this can be accomplished with a moving average of the configurations around a configuration at a particular frame or by a functional fit to approximate the changes in the configurations of the render camera, where the functional form can be composed of smooth functions. A slope of the functional fit can be constrained such that the grid camera is stable (e.g., less than a specified value).

E. Variable-Sized Segments

In one embodiment, an animated scene can be broken up into variable-sized segments. The animated scene can be analyzed to determine segments that satisfy the criteria of the first amount being within the threshold, and determine segments that are not within the threshold. In this manner, the segments that are eligible to use a grid camera can be tailored to the specifics of the animated scene. Accordingly, the first segment can be identified by analyzing a larger segment of the animated scene to determine a part (the first segment) of the larger segment having an amount of change in the configurations of the render camera that is within the threshold.

As an example, the render camera can be pointed at an object with some shaking but little overall movement, and then pan around a three-dimensional world for short period of time, thereby moving a large amount, only to return back to the relatively stationary position pointed at the object. In such a situation, the animated scene can be broken down into three segments: (1) the first segment being the relatively stationary position of being pointed at the object, where grid camera can be used; (2) a second segment where the render camera pans around the three-dimensional world, where the render camera is used to determine the grids and not a separate grid camera; (3) a third segment back at the relatively stationary position pointed at the object.

The identification of variable sized segments can be implemented in various ways. In one implementation, the notion of a combined segment can be used. Initially, relatively short uniform segments can be used to identify eligible segments, and then consecutive eligible segments can be combined to provide a combined segment of variable size. In another limitation, the moving window of specified length can be used to determine parts of the animated scene where large amounts of change occur in the configuration of the render camera. Such an example can identify an initial part of the window and/or the middle part of the window as a subsegment of a larger variable-sized segment as being eligible to use the grid camera.

IV. Real-Time—when Future Action is not Explicitly Known

For a movie, one knows the positions of the render camera throughout an animated scene. However, for a real-time system (e.g., video game), the exact position of the render camera is not specifically known. Thus, in one embodiment, a prediction of the configurations of the render camera and a next segment is made. These predicted configurations can be used to determine whether a first amount is within a threshold or outside of threshold. The next segment can be of various lengths, it may simply be a length of time between decision points and determining whether the next segment is eligible to use a grid camera. Further, exit criteria may be used to stop/suspend use the grid camera and begin use of the render camera for determining the grids during a next segment previously identified as being eligible to use a grid camera

A. Method

Figure 9:
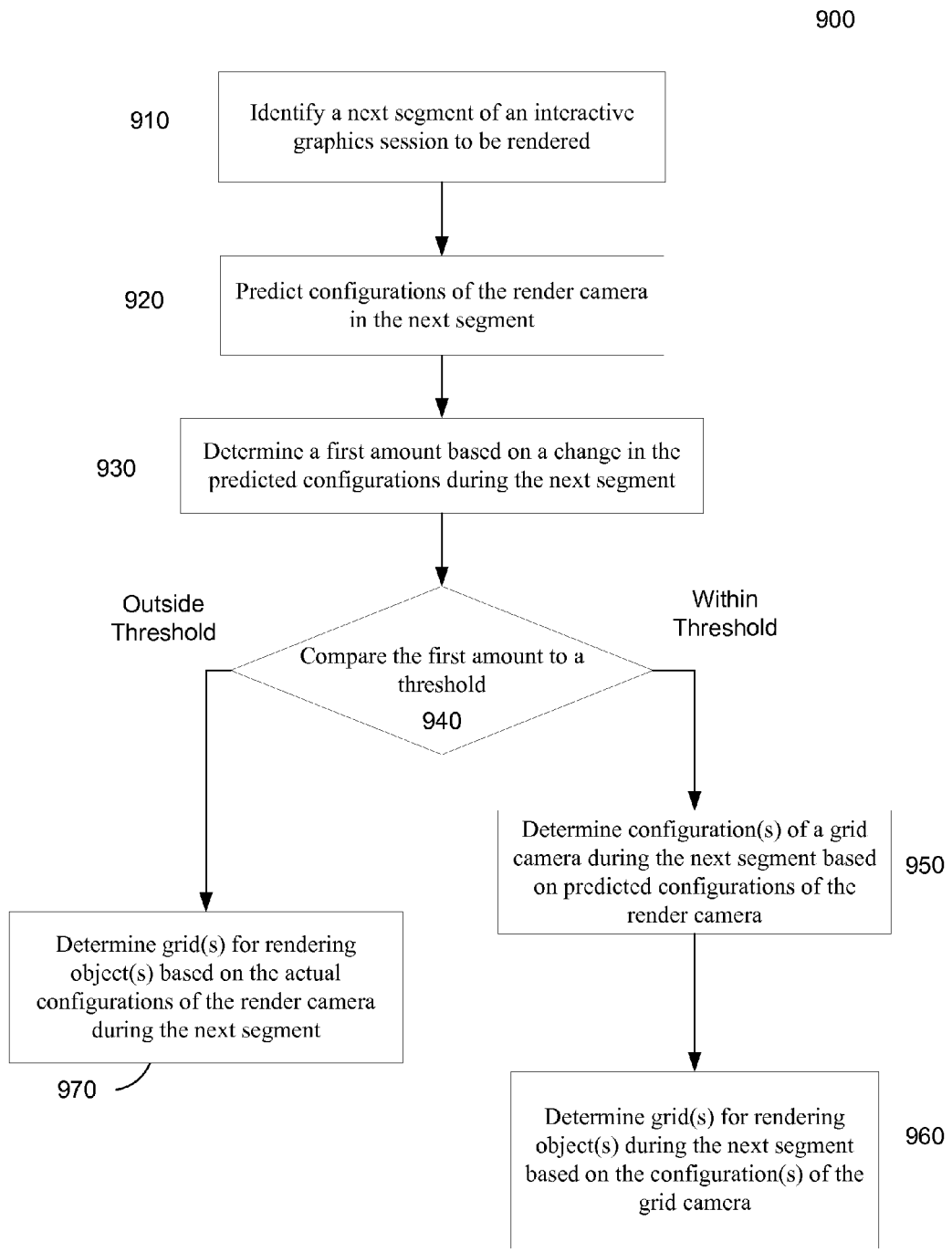
FIG. 9 is a flowchart of method 900 for performing computer-generated animation of an interactive graphics session according to embodiments.

FIG. 9 is a flowchart of method 900 for performing computer-generated animation of an interactive graphics session according to embodiments. As the graphic session is interactive, the configurations of the render camera are not known before him. The render camera can be the view from a first-person videogame.

At block 910, a next segment of an interactive graphics session to be rendered is identified. The next segment includes a plurality of images that are each to be determined based on a configuration of a render camera in a three-dimensional animated world. The next segment can be fixed or variable length. For example, the length of the next segment can be dependent on what previously has occurred in the graphic session and the present environment of the graphics session (e.g., where the character of a video game is that in the three-dimensional animated world). The next segment can be determined based on current point in time in which an eligibility of the next segment to use a grid camera is determined.

At block 920, the configurations of the render camera in the next segment are predicted. In one embodiment, the configurations of the render camera can be predicted based on configurations in a previous segment. For example, the configurations of the render camera in a previous window of time relative to the current time can be analyzed. If the configurations of the render camera are predictable (e.g., stationary or constant change, or periodic change), then the configurations the next segment can be identified as being predictable.

In one implementation, the determination that the configurations of the next segment are predictable is required before proceeding to determine whether the next segment is eligible to use the grid camera. In another implementation, the prediction for the configurations of the next segment can be made regardless of the predictability, but inaccuracy of the predicted configurations can be determined. The accuracy of the predicted configurations may result in a broader range of predicted configurations, which may impact the eligibility of the next segment to use a grid camera. The previous window time can be a fixed or variable length.

In another embodiment, the configurations of the render camera can be predicted based on the current environment of the interactive graphics session. For example, the first-person character can be in an environment where the amount of movement is constrained, e.g., confined to move within a defined spatial area or have speed of movement constrained. The current environment and previous configurations can both be used to determine eligibility of the next segment.

At block 930, a first amount is determined based on a change in the predicted configurations during the next segment. The first amount can be determined in a similar manner as described above, e.g., for method 500. Thus, the first amount can be a maximal change in configuration or a statistical value (e.g., deviation or variance). Additional criteria may also be determined, such as determining a maximal change and a statistical value, where both may be compared to respective thresholds.

At block 940, the first amount is compared to a threshold. This comparison may be performed as described above e.g., for method 500. Thus, the threshold may correspond to any range, such as above or below the threshold. Various amounts thresholds may be used in combination to determine eligibility of the next segment.

In one implementation, the first amount can correspond to a frequency and/or amplitude of oscillation of the predicted configurations around a central configuration, and the threshold may be used to identify eligibility when the changes occur quickly and in large amounts (i.e., within the threshold means greater than a threshold in this example). Such changes may cause artifacts and be computationally intensive to track, and since the user may not spend much time at any given configuration, differences in the images obtained from the grid camera and the render camera would not be noticeable to the user.

In another implementation, if a total amount moved by the render camera during the previous time window is less than a threshold and there is high variation, then a grid camera is used. If there is low variation or frequency of variation, then a grid camera is not used as differences between the grid camera in a render camera may be more noticeable to the user.

At block 950, when the first amount is within the threshold, one or more configurations of a grid camera during the next segment are determined based on the predicted configurations of the render camera. The one or more configurations of the grid camera differ from the predicted configurations of the render camera. The configurations of the grid camera can be determined as described above. Thus, a change in the configurations of the grid camera during the next segment can be more stable (e.g., stationary) than the predicted configurations of the render camera.

In one embodiment, the one or more configurations of the grid camera for the next segment are set at the time of determining the next segment is eligible. For example, the grid camera can be determined to have a certain configuration for the next segment or have a prescribed set of configurations, such as a constant change (but change less than what was predicted in the configurations of the render camera).

In another embodiment, the configurations of the grid camera for the next segment can be altered during the next segment based on the actual configurations of the render camera during the next segment. In this manner, the actual configurations of the render camera can be used to improve the configurations of the grid camera, while still allowing a more stable grid camera to be used. Thus, the change in the configurations of the grid camera may follow the actual configurations of the render camera, but not do so exactly. For example, the change of the actual configurations can be scaled, which may be determined based on the previous configurations of the render camera. However, if the actual configurations deviate significantly from the predicted configurations (e.g., when the deviation exceeds a cutoff), the use of the grid camera can be stopped. A significant deviation may be a signal that the model used to determine the predicted configurations is not accurate for the actual configurations.

At block 960, one or more grids are determined based on the one or more configurations of the grid camera. The grid may be determined as described above. For example, a resolution of a grid for an object a part of an object can be determined based on the location of the object and a configuration of the grid camera for a given frame.

At block 970, when the first amount is outside the threshold, one or more grids are determined based on actual configurations of the render camera during the next segment. The actual configurations of the render camera are the configurations determined by the user of the interactive graphics session. Regardless of how the grids are determined, the grids may be used for rendering the one or more objects during the next segment.

B. Using Configurations of Previous Segment

Figure 10:
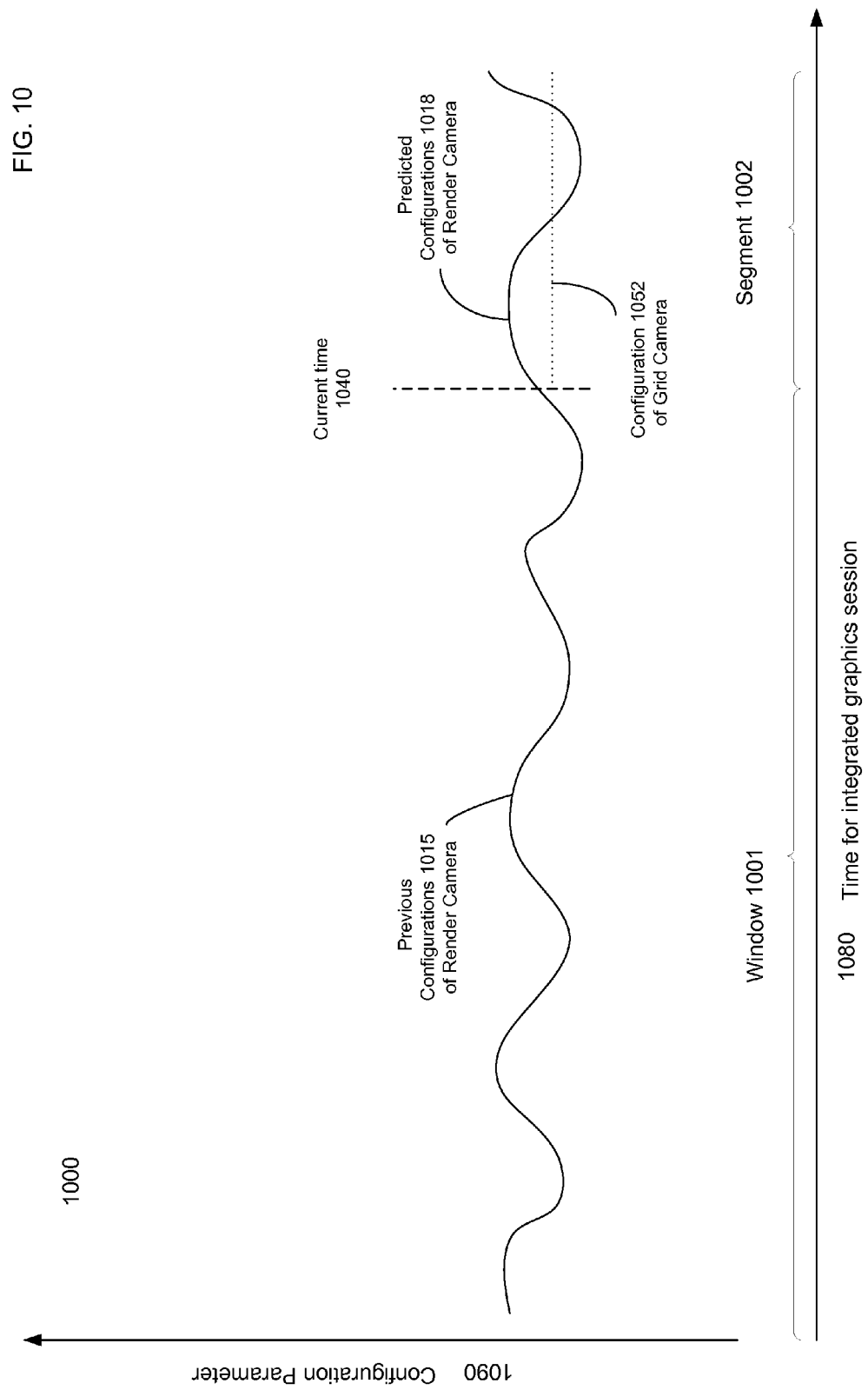
FIG. 10 is a diagram 1000 illustrating the determination of whether to use a grid camera for a next segment using configurations in a previous segment of an integrated graphics session according to embodiments.

FIG. 10 is a diagram 1000 illustrating the determination of whether to use a grid camera for a next segment using configurations in a previous segment of an integrated graphics session according to embodiments. Horizontal axis 1080 and vertical axis 1090 are similar to that of previous diagrams. Further interactive graphics session, the current time 1040 corresponds the point in time where the determination is made as to whether to use a grid camera for next segment.

The segment 1002 corresponds to the next segment. Window 1001 corresponds to the time that the previous configurations 1015 of the render camera are used to predict configurations of the render camera after current time 1040. Window 1001 can be of fixed length or variable length, which may depend on the lengths of segments used previously.

Predicted configurations 1018 of the render camera are shown to the right of current time 1040. When the predicted configurations 1018 are within a threshold (which is the case as shown), configuration 1052 of the grid camera is determined. In this example, a constant configuration of the grid camera is used as previous configurations 1015 show oscillatory movement around the constant value for configuration 1052. Thus, predicted configurations have a similar oscillatory movement, and a constant configuration for the grid camera can be used.

If the motion of the previous segment spans a large amount, then one can expect large amounts of movement in the next segment. In such a case, the render camera can be used to determine the grid resolution. However, the motion of the previous segment was not large (e.g. oscillating movement), then a grid camera whose configurations are different than the render camera can be used.

In one embodiment, the predicted configurations during the next segment can simply be previous configurations. In this manner, the first amount can be determined for the previous configurations as the predicted configurations are taken to be identical to the previous configurations. In such an embodiment, the first amount can correspond to a measure of variation of the plurality of configurations of the render camera during the previous window of time.

C. Using Actual Configurations of Render Camera

The positions of the grid camera can be based on the previous configurations of previous segment and can be based on the configurations of the render camera during the current segment. For example, the configuration of the grid camera can change only a fraction of how the render camera changes (e.g., using a scaling factor), which can reduce high frequency contributions.

Figure 11:
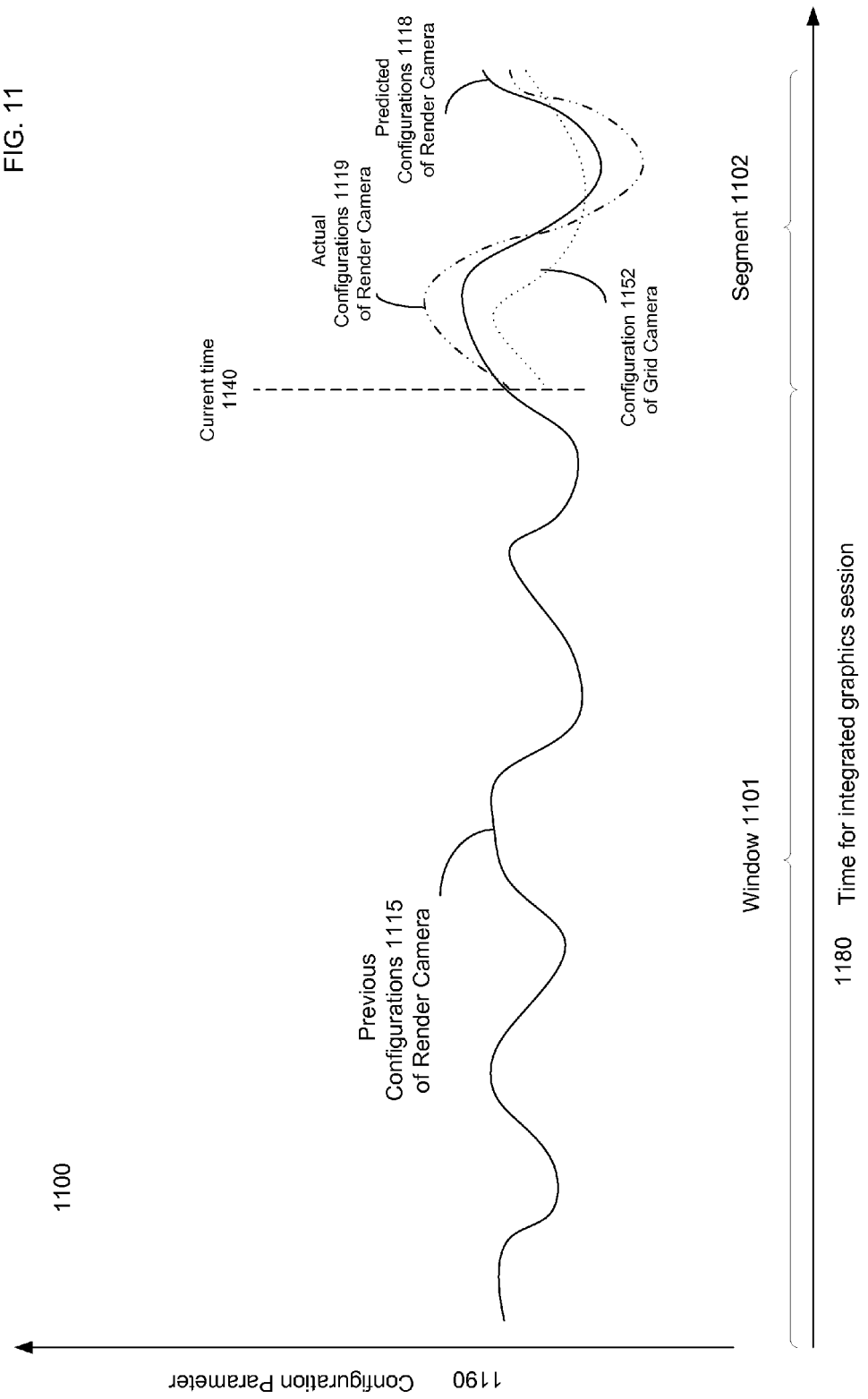
FIG. 11 is a diagram 1100 illustrating the determination of configurations of a grid camera for a next segment using actual configurations of the render camera during the next segment according to embodiments.

FIG. 11 is a diagram 1100 illustrating the determination of configurations of a grid camera for a next segment using actual configurations of the render camera during the next segment according to embodiments. Horizontal axis 1180 and vertical axis 1190 are similar to that of previous diagrams. Further interactive graphics session, the current time 1140 corresponds the point in time where the determination is made as to whether to use a grid camera for next segment.

The segment 1102 corresponds to the next segment. Window 1101 corresponds to the time that the previous configurations 1115 of the render camera are used to predict configurations of the render camera after current time 1140. Predicted configurations 1118 of the render camera are shown to the right of current time 1140.

The actual configurations 1119 of the render camera are also shown. The deviations from the predicted configurations 1118 and actual configurations 1119 can be seen in diagram 1100. Given this, configuration 1152 of the grid camera may be allowed to change due to the deviation.

For example, if the render camera has been shaking all over the place and a command is received from the render camera 90° in one frame (or short timeframe), then the grid camera might only move 45° in that one frame, and then move the additional 45° of the render camera stays at that same location. The amount of scaling (e.g., 45° as opposed to the full 90°) can be dependent on previous configurations in window 1101. Such a technique can avoid situation where the render camera moves the full 90° and then moves back very quickly, as then the grid camera would not need to move the full amount.

D. Stopping Use of Grid Camera

Figure 12:
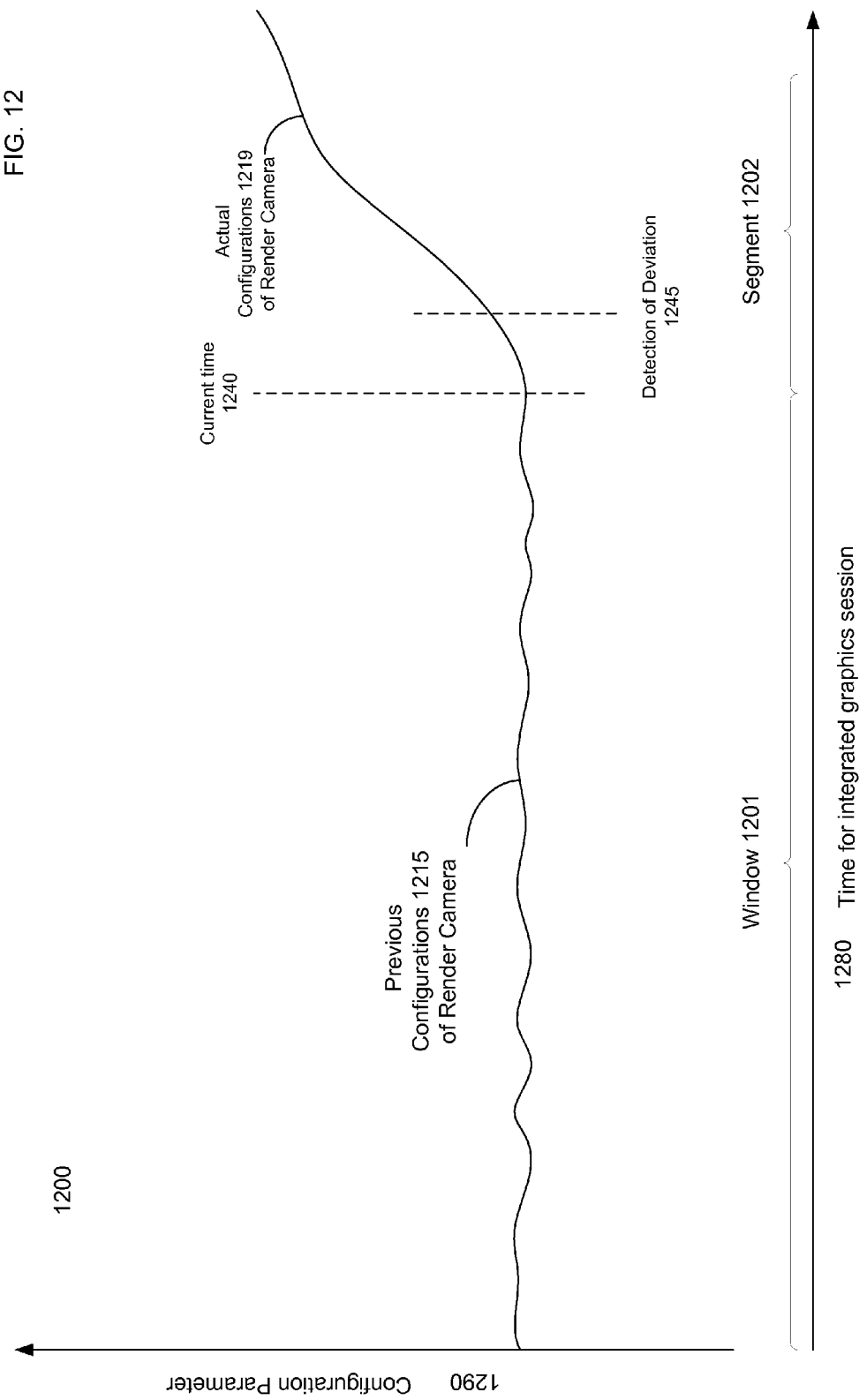
FIG. 12 is a diagram 1200 illustrating the determination of whether to stop using a grid camera for a next segment based on actual configurations of the render camera according to embodiments.

FIG. 12 is a diagram 1200 illustrating the determination of whether to stop using a grid camera for a next segment based on actual configurations of the render camera according to embodiments. Horizontal axis 1280 and vertical axis 1290 are similar to that of previous diagrams. For the interactive graphics session, the current time 1240 corresponds the point in time where a preliminary determination is made as to whether to use a grid camera for next segment. The predicted configurations are no shown, but may be similar to previous configurations 1215.

At time 1245, a significant deviation is detected. Thus, at that time the use of the grid camera is stopped and the render camera is used to determine the grids. In one implementation, a difference of the configurations of the grid camera from the configurations of the render camera can be tracked and not be allowed exceed a cutoff. In this manner, if the render camera moves unexpectedly, the images will not appear distorted due to an inaccurate grid camera. As an example, if the render camera receives a command to change 90 degrees and the render camera was not changing much in the previous window, the configurations of the render camera can be used to determine the grids of the objects.

Accordingly, a difference between the actual configurations of the render camera and the one or more configurations of the grid camera can be tracked during the next segment. The use of the grid camera to determine the one or more grids can be stopped when the difference exceeds a cutoff.

E. Making Predictions Based on Other Factors

In addition to or instead of previous configurations of the render camera, the current environment of the interactive graphics session may be used to determine the predicted configurations of the render camera during the next segment. For example, there may be an allowable range of configurations of the render camera that is possible during the next segment due to the current environment. Such constraints of the current environment might occur when the character of a game is confined to a narrow hallway or is cornered by other characters. Thus, predictions can also be made based on the environment to determine a range of motion that is possible.

V. Examples

As mentioned above, there is configuration parameters may be used to determine amounts of change for comparison to a threshold. A render engine of a computer system can detect when render camera movement is under a maximum threshold (e.g., as determined by parameters fovTol, posTol, and focusTol). The grid camera can be added, and any necessary settings can be disabled. In one implementation, the grid camera is active in every render layer, unless overridden.

In various embodiments, the following tolerances may be used for the corresponding configuration parameters. The fovTol tolerance corresponds to the maximum tolerance for vertical field of view (FOV) change (e.g., 10 degrees) that will allow the grid camera to activate. The posTol tolerance corresponds to the maximum tolerance (e.g., 0.1) for the render camera position change that will allow the grid camera to activate. This configuration parameter can be defined as the distance between the render camera in the grid camera divided by the focus of the render camera. The focusTol tolerance (e.g., 0.05) corresponds to a maximum tolerance for depth of field blur that will allow the grid camera to activate. This configuration parameter can be an approximation of the maximum difference in circle of confusion size at some depth in the render camera compared to the grid camera, expressed as a percentage of image width.

In various embodiments, the changes in configuration of the render camera can be determined based on the following input arguments. The changes can be determined from a particular frame for comparing the render camera's view to the grid camera. If no frame is given, the first frame of the animated scene or interactive graphics session can be used. The motion factor (nomofac) can be disabled on the given scopes. The focus factor (nofofac) can be disabled on the given scopes. A deleteOnFail argument can be set to delete the already existing grid camera if tolerances fail. A deactivateOnFail argument can be set to deactivate the already existing grid camera if tolerances fail. A forceFocus argument can be set to create the grid camera anyway and turn off focus factor, if only the tolerance (focusTol) for the focus fails. A hook argument be set to identify the file to write in. A cue argument can be set to cue file to write in. A camName argument can be set to name the grid camera.

In one embodiment, the configurations of the grid camera can be determined as follows. In step 1, the grid camera can be moved to the average render camera position in an average orientation is used. In step 2, the field of views widen to include all render camera far planes. In step 3, the position of the grid camera is walked backwards along an average forward vector until all of the render camera near planes are in the frustum of the grid camera. In step 4, the focus distance of the grid camera is set to the average z-depth of all of the render camera's focal planes (i.e., real configurations during a segment). In step 5, the aperture of the grid camera is set such that the average z-depth at which the render camera's circle of confusion is a constant size, thereby creating a circle of confusion of that size.

VI. System

Figure 13:
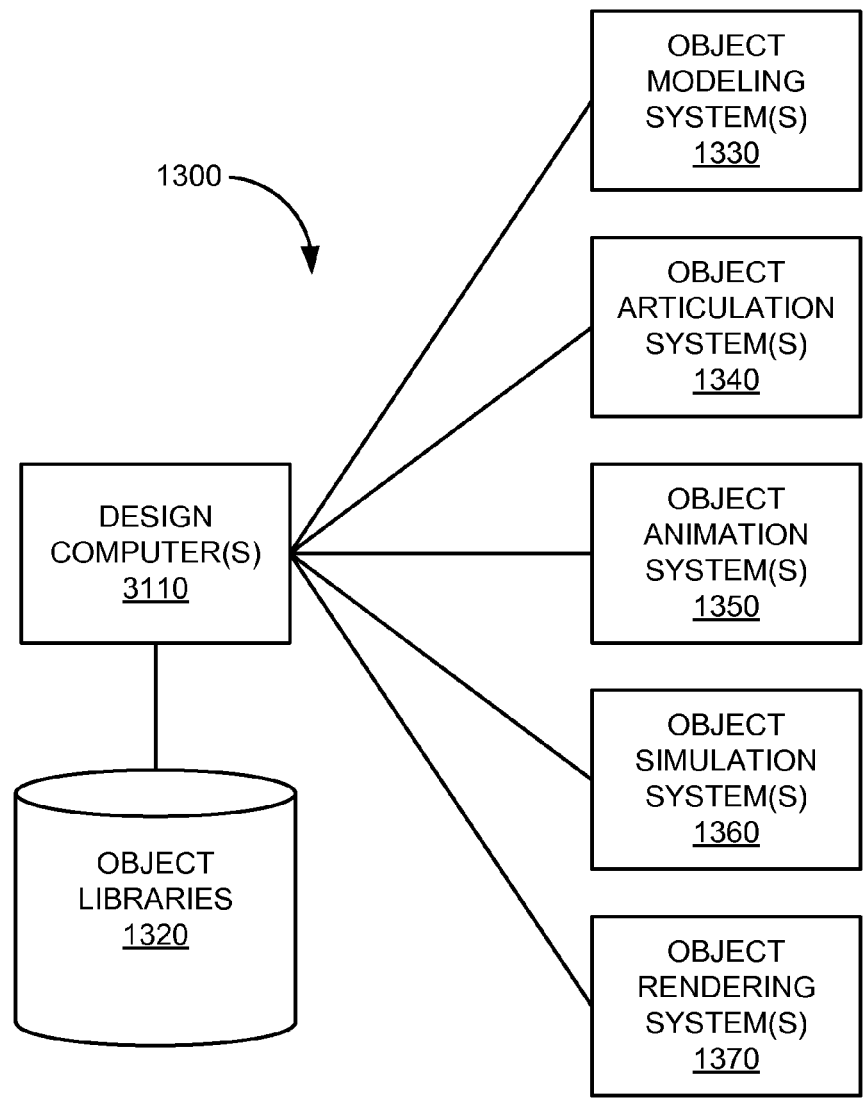
FIG. 13 is a simplified block diagram of a system for creating computer graphics imagery (CGI) and computer-aided animation that may implement or incorporate various embodiments of the present invention.

FIG. 13 is a simplified block diagram of system 1300 for creating computer graphics imagery (CGI) and computer-aided animation that may implement or incorporate various embodiments. In this example, system 1300 can include one or more design computers 1310, object library 1320, one or more object modeler systems 1330, one or more object articulation systems 1340, one or more object animation systems 1350, one or more object simulation systems 1360, and one or more object rendering systems 1370. Any of the systems 1330-1370 may be invoked by or used directly by a user of the one or more design computers 1310 and/or automatically invoked by or used by one or more processes associated with the one or more design computers 1310. Any of the elements of system 1300 can include hardware and/or software elements configured for specific functions.

The one or more design computers 1310 can include hardware and software elements configured for designing CGI and assisting with computer-aided animation. Each of the one or more design computers 1310 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1310 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1310 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1310 acting as an animator may employ one or more systems or tools to specify motion and position of one or more objects over time to produce an animation.

Object library 1320 can include elements configured for storing and accessing information related to objects used by the one or more design computers 1310 during the various stages of a production process to produce CGI and animation. Some examples of object library 1320 can include a file, a database, or other storage devices and mechanisms. Object library 1320 may be locally accessible to the one or more design computers 1310 or hosted by one or more external computer systems.

Some examples of information stored in object library 1320 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1330 can include hardware and/or software elements configured for modeling one or more objects. Modeling can include the creating, sculpting, and editing of an object. In various embodiments, the one or more object modeling systems 1330 may be configured to generated a model to include a description of the shape of an object. The one or more object modeling systems 1330 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1330 may further generate model data (e.g., 2D and 3D model data) for use by other elements of system 1300 or that can be stored in object library 1320. The one or more object modeling systems 1330 may be configured to allow a user to associate additional information, metadata, color, lighting, rigging, controls, or the like, with all or a portion of the generated model data.

The one or more object articulation systems 1340 can include hardware and/or software elements configured to articulating one or more computer-generated objects. Articulation can include the building or creation of rigs, the rigging of an object, and the editing of rigging. In various embodiments, the one or more articulation systems 1340 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1340 may further generate articulation data (e.g., data associated with controls or animations variables) for use by other elements of system 1300 or that can be stored in object library 1320. The one or more object articulation systems 1340 may be configured to allow a user to associate additional information, metadata, color, lighting, rigging, controls, or the like, with all or a portion of the generated articulation data.

The one or more object animation systems 1350 can include hardware and/or software elements configured for animating one or more computer-generated objects. Animation can include the specification of motion and position of an object over time. The one or more object animation systems 1350 may be invoked by or used directly by a user of the one or more design computers 1310 and/or automatically invoked by or used by one or more processes associated with the one or more design computers 1310.

In various embodiments, the one or more animation systems 1350 may be configured to enable users to manipulate controls or animation variables or utilized character rigging to specify one or more key frames of animation sequence. The one or more animation systems 1350 generate intermediary frames based on the one or more key frames. In some embodiments, the one or more animation systems 1350 may be configured to enable users to specify animation cues, paths, or the like according to one or more predefined sequences. The one or more animation systems 1350 generate frames of the animation based on the animation cues or paths. In further embodiments, the one or more animation systems 1350 may be configured to enable users to define animations using one or more animation languages, morphs, deformations, or the like.

The one or more object animations systems 1350 may further generate animation data (e.g., inputs associated with controls or animations variables) for use by other elements of system 1300 or that can be stored in object library 1320. The one or more object animations systems 1350 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 1360 may be invoked by or used directly by a user of the one or more design computers 1310 and/or automatically invoked by or used by one or more processes associated with the one or more design computers 1310.

In various embodiments, the one or more object simulation systems 1360 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1360 may be used to simulate the behavior of objects, such as hair, fur, and cloth, in response to a physics model and/or animation of one or more characters and objects within a computer-generated scene.

The one or more object simulation systems 1360 may further generate simulation data (e.g., motion and position of an object over time) for use by other elements of system 100 or that can be stored in object library 1320. The generated simulation data may be combined with or used in addition to animation data generated by the one or more object animation systems 150. The one or more object simulation systems 1360 may be configured to allow a user to associate additional information, metadata, color, lighting, rigging, controls, or the like, with all or a portion of the generated simulation data.

The one or more object rendering systems 1370 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1370 may be invoked by or used directly by a user of the one or more design computers 1310 and/or automatically invoked by or used by one or more processes associated with the one or more design computers 1310. One example of a software program embodied as the one or more object rendering systems 1370 can include PhotoRealistic RenderMan, or PRMan, produced by Pixar Animations Studios of Emeryville, Calif.

In various embodiments, the one or more object rendering systems 1370 can be configured to render one or more objects to produce one or more computer-generated images or a set of images over time that provide an animation. The one or more object rendering systems 1370 may generate digital images or raster graphics images.

In various embodiments, a rendered image can be understood in terms of a number of visible features. Some examples of visible features that may be considered by the one or more object rendering systems 1370 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1370 may further render images (e.g., motion and position of an object over time) for use by other elements of system 1300 or that can be stored in object library 1320. The one or more object rendering systems 1370 may be configured to allow a user to associate additional information or metadata with all or a portion of the rendered image.

Figure 14:
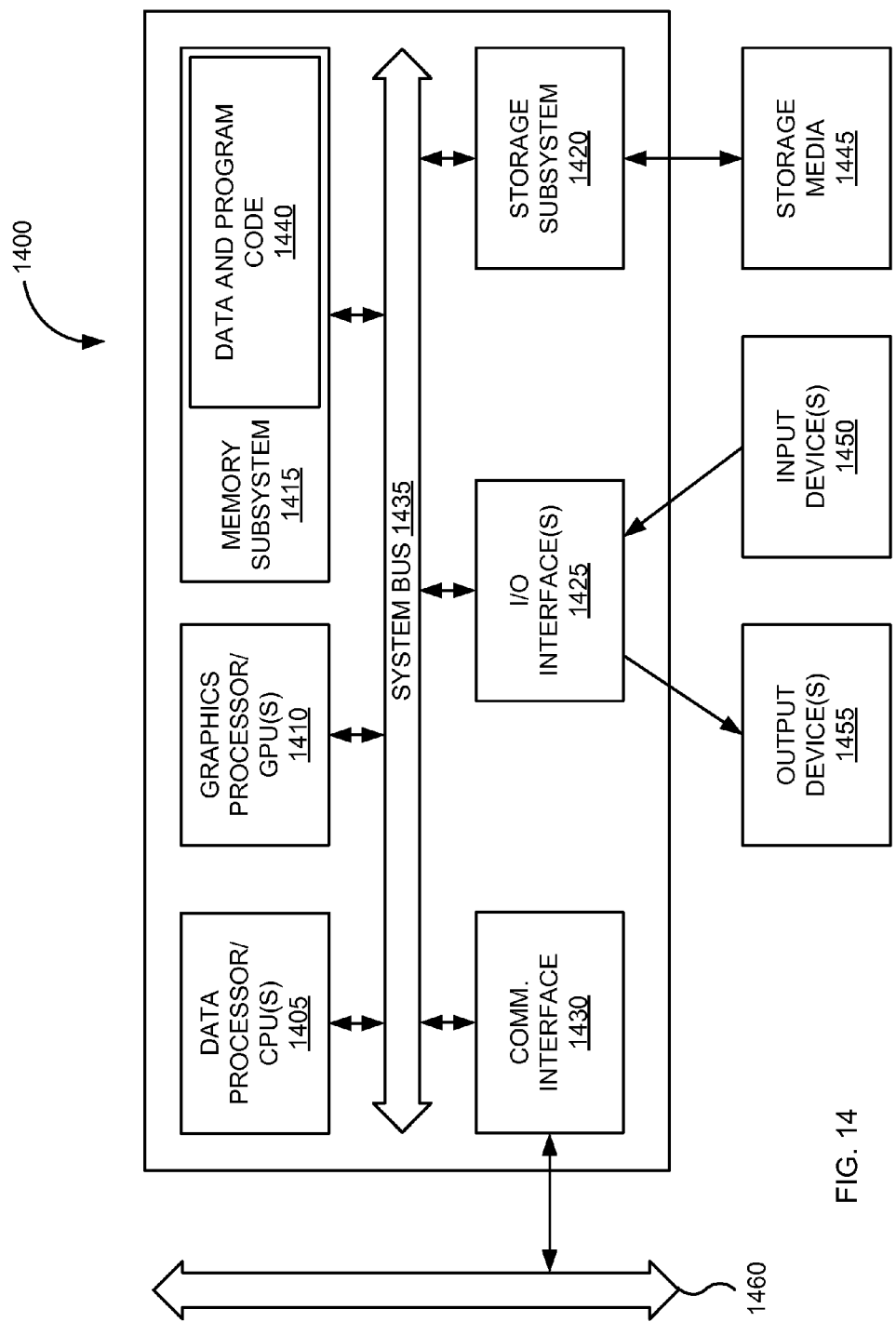
FIG. 14 is a block diagram of a computer system or information processing device that may incorporate an embodiment, be incorporated into an embodiment, or be used to practice any of the innovations, embodiments, and/or examples found within this disclosure.

FIG. 14 is a block diagram of computer system 1400. FIG. 14 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1400 and any of its components or subsystems can include hardware and/or software elements configured for performing methods described herein.

Computer system 1400 may include familiar computer components, such as one or more one or more data processors or central processing units (CPUs) 1405, one or more graphics processors or graphical processing units (GPUs) 1410, memory subsystem 1415, storage subsystem 1420, one or more input/output (I/O) interfaces 1425, communications interface 1430, or the like. Computer system 1400 can include system bus 1435 interconnecting the above components and providing functionality, such connectivity and inter-device communication.

The one or more data processors or central processing units (CPUs) 1405 can execute logic or program code or for providing application-specific functionality. Some examples of CPU(s) 1405 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1410 can execute logic or program code associated with graphics or for providing graphics-specific functionality. GPUs 1410 may include any conventional graphics processing unit, such as those provided by conventional video cards. In various embodiments, GPUs 1410 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1410 may include any number of registers, logic units, arithmetic units, caches, memory interfaces, or the like.

Memory subsystem 1415 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1415 can include data and program code 1440.

Storage subsystem 1420 can also store information using machine-readable articles, information storage devices, or computer-readable storage media. Storage subsystem 1420 may store information using storage media 1445. Some examples of storage media 1445 used by storage subsystem 1420 can include floppy disks, hard disks, optical storage media such as CD-ROMS, DVDs and bar codes, removable storage devices, networked storage devices, or the like. In some embodiments, all or part of data and program code 1440 may be stored using storage subsystem 1420.

The one or more input/output (I/O) interfaces 1425 can perform I/O operations. One or more input devices 1450 and/or one or more output devices 1455 may be communicatively coupled to the one or more I/O interfaces 1425. The one or more input devices 1450 can receive information from one or more sources for computer system 1400. Some examples of the one or more input devices 1450 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1450 may allow a user of computer system 1400 to interact with one or more non-graphical or graphical user interfaces to enter a comment, select objects, icons, text, user interface widgets, or other user interface elements that appear on a monitor/display device via a command, a click of a button, or the like.

The one or more output devices 1455 can output information to one or more destinations for computer system 1400. Some examples of the one or more output devices 1455 can include a printer, a fax, a feedback device for a mouse or joystick, external storage systems, a monitor or other display device, a communications interface appropriately configured as a transceiver, or the like. The one or more output devices 1455 may allow a user of computer system 1400 to view objects, icons, text, user interface widgets, or other user interface elements. A display device or monitor may be used with computer system 1400 and can include hardware and/or software elements configured for displaying information.

Communications interface 1430 can perform communications operations, including sending and receiving data. Some examples of communications interface 1430 may include a network communications interface (e.g. Ethernet, Wi-Fi, etc.). For example, communications interface 1430 may be coupled to communications network/external bus 1460, such as a computer network, a USB hub, or the like. A computer system can include a plurality of the same components or subsystems, e.g., connected together by communications interface 1430 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1400 may also include one or more applications (e.g., software components or functions) to be executed by a processor to execute, perform, or otherwise implement techniques disclosed herein. These applications may be embodied as data and program code 1440. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1415 and/or storage subsystem 1420.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of computer-generated animation, the method comprising:
   identifying a first segment of an animated scene to be rendered;
   receiving a plurality of configurations of a render camera during the first segment, each configuration occurring at a different point in time during the first segment, wherein the configurations of the render camera determine one or more objects seen in images of the first segment of the animated scene; and
   rendering the first segment of the animated scene using the render camera and a grid camera, the grid camera being configured based on the configurations of the render camera and being used to determine a resolution of a grid of each of the one or more objects seen by the render camera, wherein the rendering of the first segment of the animated scene comprises:
      determining a first amount based on a change in the configurations of the render camera between different points in time during the first segment;
      comparing the first amount to a threshold;
      when the first amount is within the threshold:
         determining one or more configurations of the grid camera during the first segment based on the configurations of the render camera, the one or more configurations of the grid camera differing from the configurations of the render camera;
         determining one or more first grids for rendering the first segment based on the one or more configurations of the grid camera; and
         rendering the first segment of the animated scene based on the one or more objects viewable from a point of view of the render camera in images of the first segment and using the one or more first grids determined using the one or more configurations of the grid camera during the first segment;
      when the first amount is outside the threshold:
         determining one or more second grids based on the plurality of configurations of the render camera during the first segment; and
         using the one or more second grids in rendering the one or more objects during the first segment, wherein the method is performed by a computer system.

2. The method of claim 1, wherein a configuration includes one or more geometric parameters and one or more optical parameters.

3. The method of claim 1, wherein the first amount is determined from a maximum change in a configurations parameter during the first segment.

4. The method of claim 1, wherein the one or more configurations of the grid camera are determined based on an average of a configurations parameter for the configurations of the render camera.

5. The method of claim 1, wherein the grid camera is stationary during the first segment.

6. The method of claim 1, wherein the grid camera has a plurality of configurations during the first segment, wherein each configuration of the grid camera is determined from more than one of the configurations of the render camera.

7. The method of claim 1, wherein the one or more grids include:
   a dicing grid for determining shading of the one or more objects.

8. The method of claim 1, wherein the first amount is within the threshold, and wherein the first segment is identified by analyzing a larger segment of the animated scene to determine a part of the larger segment having an amount of change in the configurations of the render camera that is within the threshold, the first segment corresponding to the part of the larger segment.

9. The method of claim 1, wherein the threshold is dependent on one or more of a length of the first segment, a second amount of change in a second configuration parameter of the render camera during the first segment, and locations of the one or more objects relative to the render camera during the first segment.

10. The method of claim 1, wherein the first amount is further determined based on a change in the configurations of the render camera during a second segment that is consecutive to the first segment.

11. The method of claim 1, wherein the first amount is within the threshold, the method further comprising:
   identifying a second segment as having a second amount within the threshold, the second segment being consecutive with the first segment in the animated scene, wherein the first segment and the second segment form a combined segment; and
   determining one or more configurations of the grid camera during the combined segment based on the configurations of the render camera during the combined segment.

12. The method of claim 1, further comprising:
   identifying a second segment subsequent to the first segment;
   receiving configurations of the render camera during the second segment;
   determining a second amount based on a change in the configurations of the render camera during the second segment;
   comparing the second amount of change to a second threshold; and
   when the second amount is within the second threshold:
      determining one or more configurations of the grid camera during the second segment based on the configurations of the render camera during the second segment, the one or more configurations of the grid camera differing from the configurations of the render camera, and
      determining one or more grids based on the one or more configurations of the grid camera;
   when the second amount is outside the threshold, determining one or more grids based on the plurality of configurations of the render camera during the second segment.

13. The method of claim 12, wherein the second segment overlaps with the first segment.

14. A computer product comprising a non-transitory computer readable medium storing a plurality of instructions that when executed control a computer system to perform computer-generated animation, the instructions comprising:
   identifying a first segment of an animated scene to be rendered;
   receiving a plurality of configurations of a render camera during the first segment, each configuration occurring at a different point in time during the first segment, wherein the configurations of the render camera determine one or more objects seen in images of the first segment of the animated scene; and rendering the first segment of the animated scene using the render camera and a grid camera, the grid camera being configured based on the configurations of the render camera and being used to determine a resolution of a grid of each of the one or more objects seen by the render camera, wherein the rendering of the first segment of the animated scene comprises:

determining a first amount based on a change in the configurations of the render camera between different points in time during the first segment;

comparing the first amount to a threshold;

when the first amount is within the threshold:
  determining one or more configurations of the grid camera during the first segment based on the configurations of the render camera, the one or more configurations of the grid camera differing from the configurations of the render camera;
  determining one or more first grids for rendering the first segment based on the one or more configurations of the grid camera; and
  rendering the first segment of the animated scene based on the one or more objects viewable from a point of view of the render camera in images of the first segment and using the one or more first grids determined using the one or more configurations of the grid camera during the first segment;

when the first amount is outside the threshold:
  determining one or more second grids based on the plurality of configurations of the render camera during the first segment; and
  using the one or more second grids in rendering the one or more objects during the first segment, wherein the method is performed by a computer system.

15. A method of computer-generated animation, the method comprising:

identifying a next segment of an interactive graphics session to be rendered, the next segment including a plurality of images that are each to be determined based on a configuration of a render camera in a three-dimensional animated world;

predicting the configurations of the render camera in the next segment; and rendering the first segment of the animated scene using the render camera and a grid camera, the grid camera being configured based on the configurations of the render camera and being used to determine a resolution of a grid of each of the one or more objects seen by the render camera, wherein the rendering of the first segment of the animated scene comprises:

determining a first amount based on a change in the predicted configurations during the next segment;

comparing the first amount to a threshold;

when the first amount is within the threshold:
  determining, by the computer system, one or more configurations of the grid camera during the next segment based on the predicted configurations of the render camera, the one or more configurations of the grid camera differing from the predicted configurations of the render camera;
  determining one or more first grids for rendering the first segment based on the one or more configurations of the grid camera; and
  rendering the first segment of the animated scene based on the one or more objects viewable from a point of view of the render camera in images of the first segment and using the one or more first grids determined using the one or more configurations of the grid camera during the first segment;

when the first amount is outside the threshold:
  determining one or more second grids based on actual configurations of the render camera during the next segment; and
  using the one or more second grids in rendering one or more objects during the next segment, wherein the method is performed by a computer system.

16. The method of claim 15, wherein predicting the configurations of the render camera in the next segment includes:
receiving a plurality of configurations of the render camera during a previous window of time of the interactive graphics session, each configuration occurring at a different point in time, wherein the configurations of the render camera determine one or more objects seen in images during the previous window of time.

17. The method of claim 16, wherein the first amount corresponds to a measure of variation of the plurality of configurations of the render camera during the previous window of time.

18. The method of claim 15, wherein predicting the configurations of the render camera in the next segment includes:
identifying an environment of the render camera in the three-dimensional animated world; and
determining an allowable range of change in one or more configuration parameters.

19. The method of claim 15, wherein the one or more configurations of the grid camera are a plurality of configurations, and wherein the plurality of configurations of the grid camera are determined based on the actual configurations of render camera during next segment.

20. The method of claim 15, further comprising:
tracking a difference between the actual configurations of the render camera and the one or more configurations of the grid camera during the next segment; and
stopping using the grid camera to determine the one or more grids when the difference exceeds a cutoff.

21. A computer product comprising a non-transitory computer readable medium storing a plurality of instructions that when executed control a computer system to perform computer-generated animation, the instructions comprising:
identifying a next segment of an interactive graphics session to be rendered, the next segment including a plurality of images that are each to be determined based on a configuration of a render camera in a three-dimensional animated world;
predicting the configurations of the render camera in the next segment; and
rendering the first segment of the animated scene using the render camera and a grid camera, the grid camera being configured based on the configurations of the render camera and being used to determine a resolution of a grid of each of the one or more objects seen by the render camera, wherein the rendering of the first segment of the animated scene comprises:
determining a first amount based on a change in the predicted configurations during the next segment;
comparing the first amount to a threshold;
when the first amount is within the threshold:
  determining, by the computer system, one or more configurations of the grid camera during the next segment based on the predicted configurations of the render camera, the one or more configurations of the grid camera differing from the predicted configurations of the render camera;

determining one or more first grids for rendering the first segment based on the one or more configurations of the grid camera; and rendering the first segment of the animated scene based on the one or more objects viewable from a point of view of the render camera in images of the first segment and using the one or more first grids determined using the one or more configurations of the grid camera during the first segment;

when the first amount is outside the threshold:

determining one or more second grids based on actual configurations of the render camera during the next segment; and using the one or more second grids in rendering one or more objects during the next segment, wherein the method is performed by a computer system.

\* \* \* \* \*